(12) United States Patent
Cox et al.

(10) Patent No.: US 11,874,119 B2
(45) Date of Patent: Jan. 16, 2024

(54) TRAFFIC BOUNDARY MAPPING

(71) Applicant: NETRADYNE, INC., San Diego, CA (US)

(72) Inventors: Jonathan Albert Cox, Albuquerque, NM (US); Veeresh Taranalli, San Francisco, CA (US); David Jonathan Julian, San Diego, CA (US); Badugu Naveen Chakravarthy, Bengaluru (IN); Michael Campos, La Jolla, CA (US); Adam David Kahn, San Diego, CA (US); Venkata Ramanan Venkatachalam Jayaraman, San Diego, CA (US); Arvind Yedla, La Jolla, CA (US)

(73) Assignee: NETRADYNE, INC., San Diego, CA (US)

( * ) Notice: Subject to any disclaimer, the term of this patent is extended or adjusted under 35 U.S.C. 154(b) by 471 days.

(21) Appl. No.: 17/145,230

(22) Filed: Jan. 8, 2021

(65) Prior Publication Data
US 2021/0142077 A1 May 13, 2021

Related U.S. Application Data

(63) Continuation of application No. 16/608,516, filed as application No. PCT/US2019/023766 on Mar. 22, 2019, now Pat. No. 10,891,497.
(Continued)

(51) Int. Cl.
*G01C 21/30* (2006.01)
*G06V 20/56* (2022.01)
*G06F 18/214* (2023.01)

*G06V 10/764* (2022.01)
*G06V 10/774* (2022.01)
*G06V 10/80* (2022.01)
*G06V 10/82* (2022.01)
*G06V 20/10* (2022.01)

(52) U.S. Cl.
CPC ........... *G01C 21/30* (2013.01); *G06F 18/214* (2023.01); *G06V 10/764* (2022.01); *G06V 10/774* (2022.01); *G06V 10/80* (2022.01); *G06V 10/82* (2022.01); *G06V 20/10* (2022.01); *G06V 20/588* (2022.01)

(58) Field of Classification Search
None
See application file for complete search history.

(56) References Cited

U.S. PATENT DOCUMENTS 8,195,394 B1 6/2012 Zhu et al.
9,201,421 B1 12/2015 Fairfield et al.
(Continued)

FOREIGN PATENT DOCUMENTS

CA 2994391 A1 2/2017
CA 2999816 A1 4/2017

OTHER PUBLICATIONS

International Search Report and Written Opinion, PCT Patent Application No. PCT/US2019/023766, dated Jun. 24, 2019; 8 pages.
(Continued)

*Primary Examiner* — Leon Flores
(74) *Attorney, Agent, or Firm* — Michael Campos

(57) ABSTRACT

The present disclosure provides devices, systems and methods for mapping of traffic boundaries.

20 Claims, 32 Drawing Sheets

Related U.S. Application Data

(60) Provisional application No. 62/647,526, filed on Mar. 23, 2018.

(56) References Cited

U.S. PATENT DOCUMENTS

| | | |
|---|---|---|
| 10,304,335 B2 | 5/2019 | Jain et al. |
| 10,481,044 B2 | 11/2019 | Sun et al. |
| 10,489,529 B2 | 11/2019 | Cahoon et al. |
| 10,521,677 B2 | 12/2019 | Micks et al. |
| 2014/0270378 A1 | 9/2014 | Aimura et al. |
| 2016/0171893 A1 | 6/2016 | Chen et al. |
| 2017/0109928 A1 | 4/2017 | Micks et al. |
| 2018/0033148 A1 | 2/2018 | Zheng et al. |
| 2018/0188027 A1 | 7/2018 | Zhang et al. |
| 2018/0188372 A1 | 7/2018 | Wheeler |
| 2018/0189578 A1 | 7/2018 | Yang et al. |
| 2018/0273031 A1* | 9/2018 | Fujita .................. G05D 1/021 |
| 2020/0182626 A1 | 6/2020 | He et al. |

OTHER PUBLICATIONS

Christian Lundquist, "Sensor Fusion for Automotive Applications," Dissertations, Jan. 1, 2011, No. 1409, 331 pages.
Extended European Search Report in EP Patent Application No. 19770796.1 dated Mar. 2, 2022, 16 pages.
First Examination Report in IN Patent Application No. 202017040972 dated Aug. 1, 2022, 6 pages.
Hendrik Deusch, "Random finite set-based localization and SLAM for highly automated vehicles," Jun. 29, 2016, 156 pages.
Huang, et al., "Spatial-Temproal Based Lane Detection Using Deep Learning," HAL Open Science, Jun. 22, 2018, 13 pages.

* cited by examiner

OBJECTS
SIGNS, SIGNALS, ROAD MARKINGS, LANDMARKS

ROAD PATH LINES
LANE LINES, ROAD BOUNDARIES, CROSSWALK, INTERSECTION

LANE-LEVEL AREA AND OBJECT ASSOCIATIONS
DRIVABLE PATH AND ROAD RULES

LANE-LEVEL TOPOLOGY
ROAD-TO-ROAD AND LANE-TO-LANE CONNECTIONS

FIG. 13

Registration(5617)

Phoenix

San Diego

TRAFFIC BOUNDARY MAPPING

CROSS-REFERENCE TO RELATED APPLICATION

The present application is a continuation of and claims the benefit of U.S. patent application Ser. No. 16/608,516 filed on 25 Oct. 2019, and titled, "TRAFFIC BOUNDARY MAPPING", which is a U.S. National Stage Application of International Application No. PCT/US2019/023766, filed on 22 Mar. 2019, which designated the United States, and which claims the benefit of U.S. Provisional Patent Application No. 62/647,526 filed on 23 Mar. 2018, and titled, "JOINT MAPPING OF VISUAL OBJECTS AND TRAFFIC BOUNDARIES", the disclosure of which is each expressly incorporated by reference in its entirety.

BACKGROUND

Field

Certain aspects of the present disclosure generally relate to visual perceptual systems, intelligent driving monitoring systems (IDMS), advanced driver assistance systems (ADAS), autonomous driving systems, and more particularly to systems and methods for mapping of traffic boundaries such as lane lines and road boundaries.

Background

A reliable map of traffic boundaries that may be seen from a camera mounted to a vehicle may benefit a number of driving related systems and devices, including IDMS, ADAS, and autonomous systems devices. For example, a mapping system may be used to determine a precise location of an autonomous vehicle or may augment a localization estimate to refine an estimate provided by GNSS. As vehicular mapping and localization systems and methods become more accurate and reliable, IDMS, ADAS, autonomous driving systems, and the like, will also become more accurate and reliable.

Current methods of vehicular mapping may perform acceptably well in some driving scenarios and weather conditions, but poorly in others. For example, vision-based simultaneous localization and mapping (SLAM) techniques may enable vehicular localization in urban environments having a dense array of visual landmarks. Unfortunately, current SLAM methods may suffer in these same situations if visual objects are too cluttered or are otherwise obscured. In addition, current visual SLAM methods may perform inaccurately and unreliably in several commonly encountered real-world driving situations having a paucity of visual landmarks, such as on open highways.

LiDAR systems may be employed in some mapping systems. LiDAR hardware, however, may be prohibitively expensive in comparison to stereo or monocular visual camera-based systems. LiDAR may perform poorly in adverse weather conditions, such as in rain or in extreme temperatures. A LiDAR based mapping system also may require significant computational resources to store, process and transmit the acquired data, which may not be well-suited for a crowd-sourced deployment at scale.

Accordingly, aspects of the present disclosure are directed to improved systems and methods for mapping that may overcome some of the challenges associated with current SLAM systems and methods, including visual SLAM systems, LiDAR SLAM systems, and the like. In particular, certain aspects of the present disclosure may reduce the cost and improve the reliability of generating high-precision maps by enabling such maps to be generated based-on monocular vision. In turn, aspects of the present disclosure may improve many driving related applications such as IDMS, driver monitoring, ADAS, and autonomous driving systems, among others.

SUMMARY OF THE INVENTION

The present disclosure provides systems and methods for mapping of traffic boundaries. Certain mapping systems and methods improve upon the prior art by using detected lane lines, road boundaries, and the like, to update map data.

Certain aspects of the present disclosure provide a system. The system comprises a memory and a processor coupled to the memory, wherein the processor is configured to: receive a first visual data at a first time from a camera coupled to a vehicle; identify a traffic boundary within the first visual data; determine a location of the vehicle within a map at the first time; and determine a location of the traffic boundary within the map, based at least in part on the location of the traffic boundary within the first visual data and the location of the vehicle at the first time.

Certain aspects of the present disclosure prove a method. The method generally comprises: determining an estimate of a location of a vehicle based at least in part on: a Global Navigation Satellite System (GNSS); an Inertial Measurement Unit (IMU); a wheel odometer; and detected objects from visual data captured by a camera, wherein the camera is affixed to the vehicle.

Certain aspects of the present disclosure prove a method. The method generally comprises: receiving visual data captured by a camera affixed to a vehicle; determining an image location of at least one of a static object or a traffic boundary from the visual data; determining a map location of the at least one static object or traffic boundary on a road-referenced landmark map; determining a position estimate of the vehicle; determining a topographic height of the vehicle based on a topographic map; and projecting the determined map location to a position relative to an earth-based anchor point.

BRIEF DESCRIPTION OF THE DRAWINGS

FIG. 13 illustrates an example of a system or method of mapping traffic boundaries in accordance with certain aspects of the present disclosure.

DETAILED DESCRIPTION

Figure 1A:
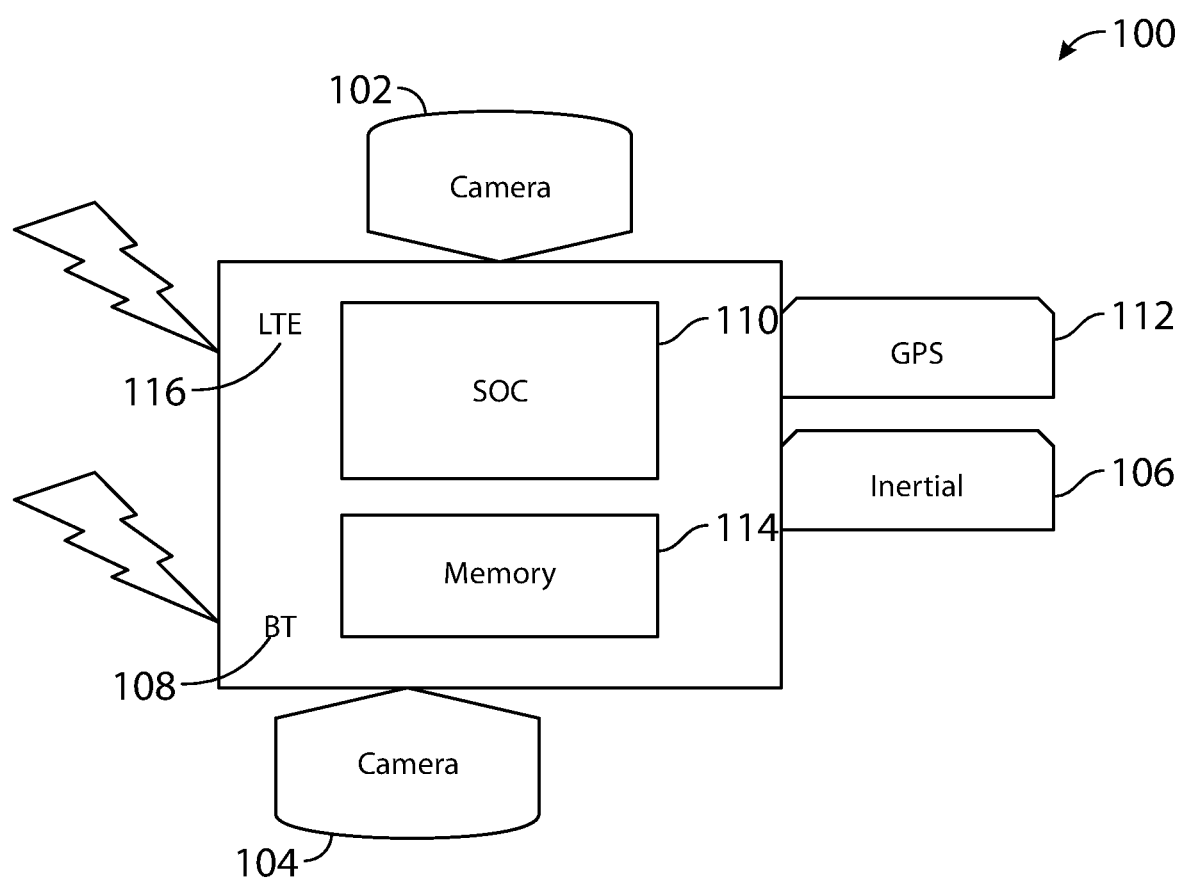
FIG. 1A illustrates an example of a device configured to map traffic boundaries in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented, or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

It must be noted that as used herein and in the appended claims, the singular forms "a", "an", and "the" include plural referents unless the context clearly dictates otherwise. Thus, for example, reference to "an object" includes a plurality of objects.

GNSS-INS Fusion with Wheel Odometry and Combined with Visual SLAM

Current vehicular systems, such as experimental autonomous driving systems, may include vision-based SLAM. As vision-based SLAM may be not provide sufficiently accurate localization, a LiDAR system may be used instead of or in addition to vision-based SLAM to improve accuracy. A LiDAR system, however, remains too expensive for widespread use. Furthermore, there are concerns that multiple LiDAR systems operating concurrently on a road may interfere with each other or emit unsafe levels of near-infrared laser radiation. Accordingly, certain aspects of the present disclosure are directed to overcoming technical challenges that have frustrated the use of vision-based SLAM. One technical improvement of the present disclosure relates to the fusion of a GNSS, IMU, wheel odometry, and vision-based SLAM that includes traffic boundaries, where traffic boundaries include lane lines and road boundaries. While various combinations of these components may be known in the art, we are aware of no system that combines all of them. In addition, certain aspects of the present disclosure may enable the use of vision-based SLAM using commercially available components that are suitable for a mass market deployment.

It is well-known that Global Navigation Satellite System (GNSS) and Inertial Measurement Unit (IMU) signals may be fused. Such systems may be referred to as GNSS-INS fusion systems, where INS may refer to an Inertial Navigation System that is includes an IMU. A typical INS may include accelerometers and gyroscopes and may sometimes include magnetic sensors. For the purposes of this application, the terms IMU and INS may be used interchangeably. In addition, a Global Positioning System (GPS) may be referred to as a GNSS. In a typical configuration, INS sensors may be self-contained. One advantage of a self-contained INS is that the readings do not depend on the vehicle in which the INS is installed. A GNSS receiver may likewise behave independently from the vehicle in which it is installed. Because each of these systems may be substantially independent of the vehicle to which they are affixed, it has become a common practice in the art to fuse GNSS and IMU signals.

In some prior art applications, GNSS-INS may be fused with wheel odometry. Alternatively, GNSS-INS may be fused with visual features, as in FastSLAM or GridSLAM. To our knowledge, these two approaches have never been combined. One reason that prior practitioners may have avoided combining these different techniques may relate to certain technical challenges discussed herein. For example, while GNSS-INS systems are becoming inexpensive commodities, a GNSS-INS that makes further use of wheel-odometry entails significant challenges. Likewise, a GNSS-INS that makes further use of vision-based SLAM features entails significant challenges, as described below. Given the complexity that attends the integration of either technology, the combined challenges of integrating both have so far proven to be overwhelming.

Another reason that prior practitioners may have avoided combining GNSS-INS and FastSLAM or GridSLAM is that SLAM has previously been thought of as a solution to GNSS-denied environments. However, we find that combining these technologies provides a multitude of benefits, including: reducing computational complexity, improving accuracy at the sub-meter scale, improving robustness, eliminating large scale drift in the map and enabling the use of a visual sensor for which there may be a reduced cost, size and/or complexity.

To better understand the technical challenges that are addressed by certain aspects of the present disclosure, consider that a GNSS-INS system may be designed independently of a vehicle on which it will be used. Since there may be no need for customization for individual vehicle types, a GNSS-INS device may be suitable for a mass-market deployment. Adding wheel-odometry to such a system entails a significant cost, however, since the wheel-odometry signal depends on a physical model of the vehicle on which it is used. For example, wheel-odometry depends at least on a diameter of a wheel of the vehicle. In addition, since wheel-odometry depends on a sensor located at the wheel, there may be a need to calibrate the positional offset of wheel sensor and the IMU sensor. Furthermore, wheel odometry signals may be difficult to access.

GNSS-INS accuracy may be improved by using visual features, but the use of visual features may also entail many engineering challenges. Visual feature processing requires significant computational processing power and sophisticated algorithms. In addition, visual features may have robustness issues. For example, visual systems may not work well in low-lighting situations, at dawn or dusk when there is a low angle of incidence to the sun, in poor weather, and so on.

Figure 1B:
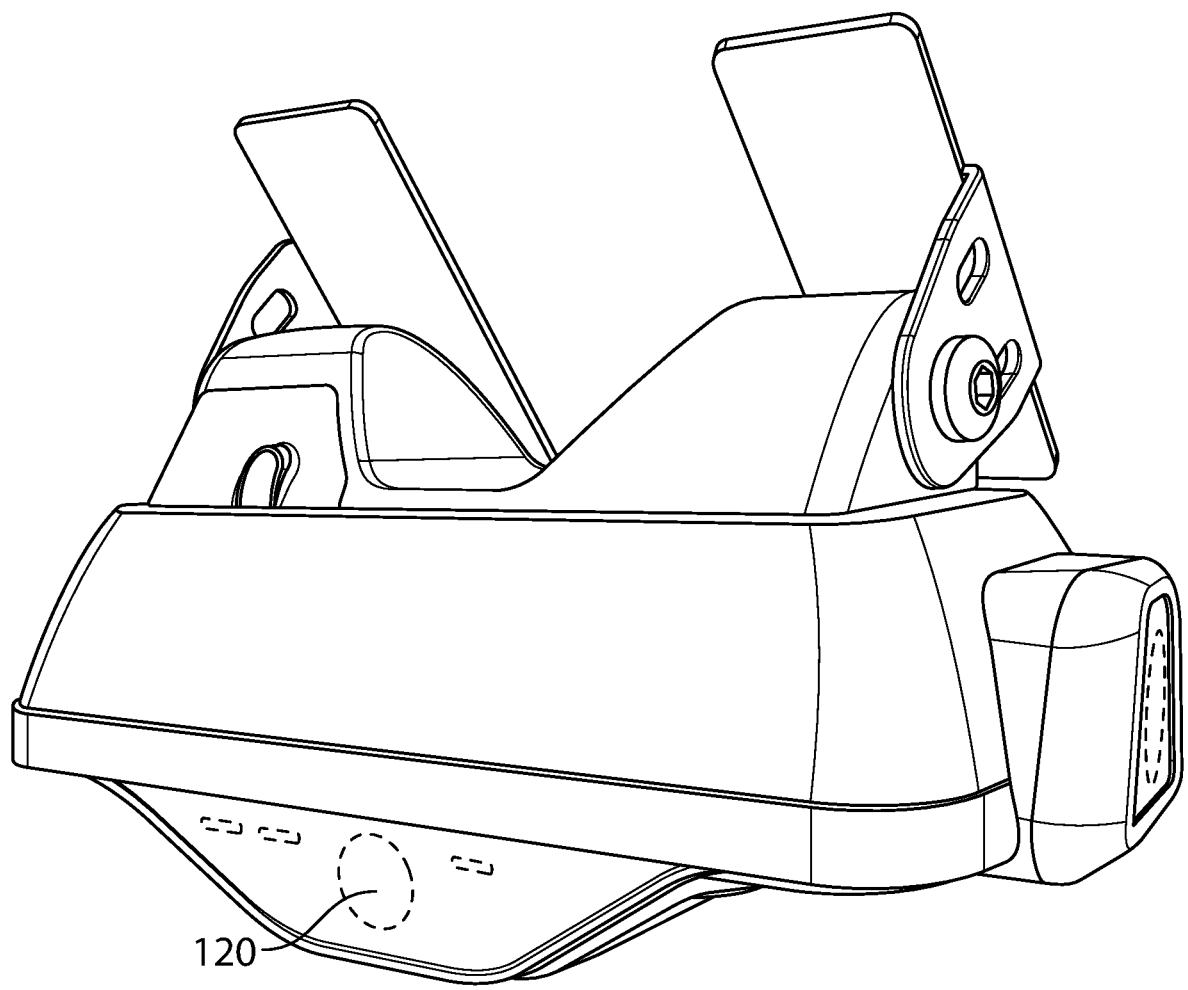
FIG. 1B illustrates an example of a device configured to map traffic boundaries in accordance with certain aspects of the present disclosure.

Here we present a novel approach to mapping and/or localization that includes detecting traffic boundaries such as lane lines, stop lines, cross walks, and road boundaries. In addition, we present a novel approach to mapping and/or localization that includes fusing of GNSS-INS with both wheel odometry and with vison-based SLAM. An example of a device that contains a processor configured to perform mapping and/or localization in accordance with certain aspects of the present disclosure is illustrated in FIG. 1. The device illustrated in FIG. 1 may be referred to as a Driveri™. The system may be considered a vision-based Internet-of-Things (IoT) driving monitoring system. The system may include a CPU, a GPU and/or specialized deep learning processor, memory storage, four cameras, communication channels, and integrated inertial sensors. The system may be further configured to access wheel odometry via a wired or wireless connection directly to the sensor path of via a CAN Bus.

Sequential and Parallel Sensor Fusion

In one embodiment, GNSS and IMU sensor information may be combined to estimate a heading of the vehicle or the device. This combined signal may also be referred to as the output of a GNSS-INS. The GNSS-IMU may then be combined with wheel odometry for an improved pose estimate (pitch, roll, yaw), as described below. In some embodiments, a pose estimate may include an offset of the camera sensor relative to direction of heading of the vehicle. A determination of a translation (x,y) relative to an anchor point (i.e. the start of a trip) may be based on GNSS and the combination of the IMU and wheel odometry.

Figure 2:
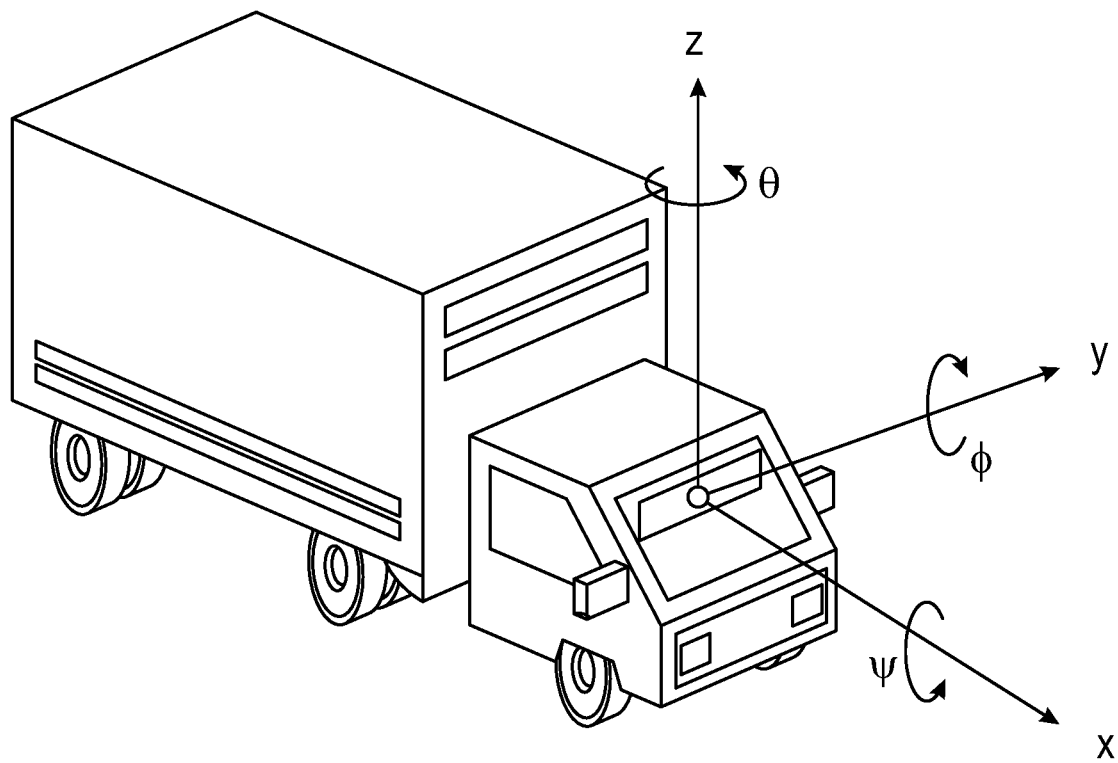
FIG. 2 illustrates an example of a device configured to map traffic boundaries in accordance with certain aspects of the present disclosure.
Figure 2:
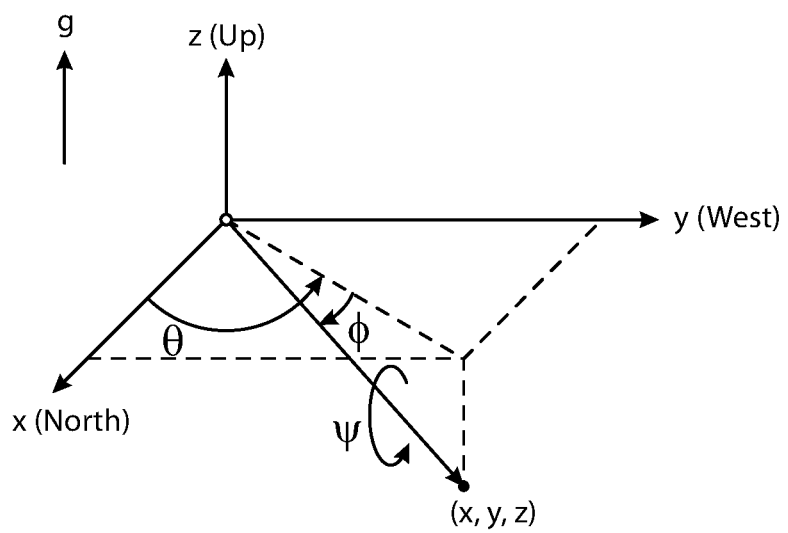

Visual data is captured on a camera sensor. The camera pose, as illustrated in FIG. 2, which may be estimated according to the method just described, may then be used to relate objects and lines that are detected in visual data (i.e. in the camera plane) to locations in the surrounding world. In an embodiment of certain aspects of the present disclosure, a neural network (e.g. deep learning model) may be used to detect one or more objects and lines in visual data. Examples of visual objects include stationary road signs, such as stop signs, speed limit signs, and the like. In certain aspects, the deep learning model may also detect lane lines and road boundaries, including inferred lane lines in visual data.

Several systems and methods of detecting objects and lane lines are contemplated, including systems and methods that are disclosed in Patent Application U.S. Ser. No. 15/437, 646—"DRIVER BEHAVIOR MONITORING" filed 21 Feb. 2016 and PCT Application PCT US/2018/54732— "SYSTEM AND METHOD OF DETERMINING A CURVE" filed 5 Oct. 2018, each of which is incorporated herein by reference in its entirety.

Along with visual detections of objects and lane lines, other sensory information may be captured in a synchronized fashion. In one embodiment, six-axis inertial measurement unit (IMU) signals, GNSS, and wheel odometry signals may be captured and received at a processing device. For example, IMU signals may include accelerometer and gyrometer signals and may be samples at 100 Hz. In addition, Global Navigation Satellite System (GNSS) data may be captured.

Various signals may be combined through a motion model. With a motion model, the next position of a particle in a particle filter may be prediction. Given a determined heading and velocity, the location of a device a short time later may be predicted. In one embodiment of certain aspects of the present disclosure, the different particles of a particle filter may incorporate differing amounts of noise.

Combination of Points and Lines in a Single Framework

Simultaneous Localization and Mapping (SLAM) refers to joint determination of a map and of the position of a device within the map. The location of objects or traffic boundaries within the map depends on the location of the device that detected them, and at the same time, the precision of the localization of the device depends on the certainty with which observable landmarks or boundaries are known.

Two main variations of SLAM techniques may be referred to as Landmark-based SLAM and GridSLAM. Landmark-based SLAM may be referred to as FastSLAM, which is an algorithmic approach commonly used for Landmark-based SLAM. GridSLAM, in contrast, is typically used with extended boundaries such as the interior walls of an office building. Unlike landmarks, interior walls of buildings are typically discernible as a boundary rather than a unique point in space (such as the center of an object). That is, when a robot is staring directly at a plain white wall in a long corridor, if may accurately know its distance from that wall, but it may not know its location along the wall.

Some prior systems maintain two separate maps, one containing the location of landmarks determined with FastSLAM, and a second containing an occupancy grid determined with GridSLAM. For example, one system teaches a robotic system to alternate between a FastSLAM map and a GridSLAM map depending on whether the robot is outdoors or indoors, respectively. Another example teaches a localization system that uses landmarks to demarcate boundaries of overlapping occupancy grids. The occupancy grids are then used to determine the location of the object.

In contrast to these previous approaches, certain aspects of the present disclosure are directed to concurrent use of both a landmark-based map and an occupancy-grid based map. Furthermore, certain aspects of the present disclosure make use of detectable features that may be expected in a vehicular context.

Visual objects detected in multiple frames (in a single pass, or crowd-sourced across multiple trips and/or driving) may be tracked in world-coordinates with extended Kalman filters, starting with the vertices of a bounding box in the image plane. As the vehicle drives by the object, vertices associated with the object in multiple frames may be fused to estimate a location of the detected object. The fusing may occur in real-time, may be processed locally in an opportunistic fashion, may be post-processed in the cloud, and the like.

Certain prior art related to GridSLAM considers a robot with a LiDAR range finding sensor. Since LiDAR sensors detect the distance and bearing to a reflective surface, such as a wall, prior embodiments of occupancy grid SLAM have been limited to mapping of reflective obstructions. The occupancy grid is then updated to maintain the probability of "occupancy" of obstructions in each cell. However, in accordance with certain aspects of the present disclosure, a occupancy grid SLAM can be performed with monocular measurements of visual objects that may not be physically elevated or depressed with respect to their surroundings, but that may still be detected with deep learning. For example, a lane line may have a different color than neighboring portions of a road but may otherwise have substantially the same height. In particular, while lane lines are not typically raised "obstructions", as a wall would be, in the sense that it may be possible to see multiple lane lines that may lie behind each other, they can nevertheless be mapped onto an occupancy grid based on certain systems and methods disclosed herein. When updating the occupancy grid with such visual objects, a LiDAR update function may not be suitable. Instead, the occupancy values associated with the cells that are detected visually are updated such that many lines, in arbitrary spatial configuration, may be detected simultaneously.

Additionally, prior art relating to occupancy grid SLAM (e.g. GridSLAM) or discrete object SLAM (e.g. FastSLAM or EKF-SLAM) has considered an environment where numerous barriers or objects exist in a particular spatial configuration that allows for a location to be estimated from wheel odometry and optical sensors. For instance, a robot with a LiDAR sensor that is navigating a straight hallway can nevertheless always determine its relative position within the corridor since it is assumed that the hallway is not unreasonably long, and the LiDAR signal will detect not only the side walls, but the end of the hallway, or at least doorways along the hallway. However, roads are often very nearly straight and uniform for long distances of several miles or more. Thus, the road is substantially uniform along the axis to the road, and occupancy grid localization alone can only accurately localize in the spatial extent that is transverse to the road. This is somewhat analogous to the hypothetical situation of a robot in an infinitely long, uniform corridor with a LiDAR sensor.

To overcome the aforementioned problem, certain aspects of this disclosure are directed to systems and methods that fuse GNSS-INS with occupancy grid SLAM and object-based SLAM (FastSLAM or EKM-SLAM) by combining the spatial probabilities these three sensor and feature inputs: (1) GNSS-INS position and attitude (pose), (2) occupancy grid localization, (3) object localization. Objects can provide localization information in one or more spatial extents, with varying uncertainty, as does GNSS-INS. By combining these three, these systems and methods may achieve improved localization in multiple spatial extents in environments that would otherwise lack sufficient information if only one or two inputs were used.

As previously mentioned, certain aspects of the present disclosure make use of three different classes of sensor input to perform simultaneous localization and mapping (SLAM): deep-learning detection of (1) objects and (2) lane lines and road boundaries, and (3) GNSS-INS. Objects are features that have a finite volume or area with a reasonably well-defined center, such as a traffic sign, traffic cone, fire hydrant, painted road markings, such as an arrow or text (e.g. " XING"), or the light on a street lamp. A road boundary, lane marking or intersection marking, in contrast, is conceptually well-represented by a line or path without area or volume, and may have, for the purposes of this invention, a virtually infinite spatial extent (e.g. the lane line on a long section of an interstate highway). Usually, one portion of such lines or paths (solid or dashed) are not readily distinguishable from any other portion.

SLAM localization is performed with a probabilistic framework. Those skilled in the art will recognize that the GNSS-INS solution and the detection of objects, after association with the corresponding objects in the map, both provide a probability distribution that constrains the location of the vehicle or robot to be localized. This may be represented by a Gaussian probability distribution with a mean and uncertainty that constrains the location of the vehicle, based on sensor input and the relationship between objects previously existing in the map and detected objects in the measured world. However, a novel aspect of this invention is the use of an occupancy grid of lane lines and road boundaries to provide an additional probabilistic constraint for vehicle localization.

One embodiment of the novel probabilistic approach may convert image detections of lane lines and road boundaries to a "bird's eye" projection. This can be done with one of several techniques, such as if the attitude, heading and camera height above the road are known. Then, each cell in an occupancy grid that represents the observed area is assigned a probability of occupancy of a lane line or road boundary. In practice, the cell size may be suitably small, such as 10×10 cm. Then, the measured occupancy grid, which encompasses a limited spatial extent, typically determined by the field of view of the cameras, is cross-correlated with the full occupancy grid map (which may span the entire Earth), in two or more dimensions (e.g. North, South and heading angle). In practice, the region of cross-correlation is limited by the GNSS-INS solution for computational tractability. After normalization, the result may represent the probability of the vehicle being located at a particular position. The result is then combined with the probability distributions resulting from the object detections and GNSS-INS solution to form a joint distribution. The vehicle location can then be estimated by some suitable choice, such as the maximum likelihood, expected position, or some combination therein.

In practice, roads, such as large interstates, consist of many similar lane lines. Therefore, if lane lines alone are used for localization, the probability distribution that results from the cross-correlation may have multiple, discrete, similarly likely positions transverse to the road. However, a road typically has only two, or perhaps four, road boundaries (as is the case for a divided highway). Therefore, independently incorporating the road boundaries helps determine the most likely of the discrete "modes" which naturally result from the lane line structure.

Another novel aspect of the present disclosure is directed to SLAM that is based on sensor detections that arise from semantically significant deep learning detections from monocular camera images. Prior approaches incorporate abstract features that lack semantic information, such as: key points, patches, pixel intensity (computer vision) or 3D point clouds (LiDAR imaging). In contrast, the deep learning-based approach described herein uses recognizable objects of interest, such as road markings, signs, cones, telephone poles, street lights and other such common objects of a vehicular context. In this way, the detected landmarks are robust. Moreover, the detected structures which this invention uses for localization are substantially the same as those which are mapped (e.g. lane markings and traffic signs). In this way, the computational complexity and information to be transmitted and stored is reduced according to needs of map generation. Prior approaches may detect and transmit not only the information needed to generate the map, but also additional information, including the abstract features that are primarily useful only for localization, and not mapping. Moreover, abstract features must typically be highly redundant since they lack the robustness of deep learning-based object and structure detection. This substantially increases the quantity of information to be transmitted, often by two orders of magnitude or more (e.g. 10 KB/km to 1 MB/km of road).

Traffic Boundary Mapping

Certain aspects of the present disclosure include an application of GridSLAM that uses monocular vision to detect lane lines and road boundaries, and then using these detections to determine how to update an occupancy grid in a modified GridSLAM framework. Lane lines may include visible lane lines, road boundaries, and inferred lane lines. While we believe that the concurrent combination of GridSLAM and FastSLAM is a novel aspect of certain aspects of the present disclosure, to our knowledge, certain aspects of the modified GridSLAM disclosed herein are also novel in their own right.

According to certain aspects, monocular vision-based detections may fill an occupancy grid. Occupancy grid localization based on monocular vision may be challenging because single frames may not uniquely specify a distance to detected objects. According to certain aspects of the present disclosure, the distance of visually detected objects, such as lanes, may be projected into an occupancy grid based on an estimate of a camera's pose.

The projection of visually detected lane lines, road boundaries, and/or inferred lane lines to an occupancy grid has never been accomplished before perhaps because of the complexity of determining a pose of a moving camera. Furthermore, certain aspects of the present disclosure build upon recent advances in lane detection discussed in PCT Application PCT US/2018/54732 mentioned supra, and accordingly other aspects of mapping and/or localizing based on detected lane positions herein disclosed are novel.

According to certain aspects, a "Mexican-hat" kernel may be applied to an occupancy grid to more accurately estimate a true position of lanes lines and road boundaries. Because there may be uncertainty about the position of the vehicle when the lanes are detected, a "Mexican-hat" kernel may provide a center-on, surround-off filter. This approach may also be substantially faster and less resource intensive than an occupancy grid approach that counts all negative as well as positive detections.

PCT Application PCT US/2018/54732, mentioned supra, teaches systems and methods for determining inferred lane boundaries, including lane boundaries that are not indicated by any road markings. One example of an inferred lane boundary may be an offset from a row of parked cars. Using a DNN approach, as herein disclosed, an inferred lane may be detected in visual data from a camera coupled to a moving vehicle. According to certain aspects, such inferred lanes may then be mapped. Likewise, a map of inferred lane lines may be used to help determine a location of a vehicle, an indication of where an autonomous vehicle should drive, where to park, and the like.

According to certain aspects, SLAM may be performed simultaneously on an occupancy grid for the lanes and the road boundaries and for point objects like stop signs and speed limit signs. By doing both of these simultaneously a correspondence between lanes and object locations within a desired error bound may be achieved. In a particle filter based FastSLAM framework, each particle stores and updates its own version of the landmark/point object map. To combine GridSLAM with FastSLAM, every particle may store and update an occupancy grid map along with the landmark/point object map with an additional condition that both the maps are stored with respect to the same world coordinate system and origin.

When particles are resampled (at regular intervals), the particle weights are derived from the measure of consistency between observations and the two maps. For example, an occupancy grid may include a much larger number of points than a landmark map of a similar geographical area. If resampling were based on the number of points, then the occupancy grid might dominate the resampling process. These measures of consistencies may be weighted between the occupancy grid map which is dense and the landmark/point object map which is sparse. Tuning this weighting for different environments during mapping may improve the accuracy of the resulting map. Accordingly, certain methods are disclosed to balance the occupancy grid and landmark map representations in the sampling process. For example, the resampling may be based on a low-pass filtered metric relating to the number of visual objects and lane lines detected in recent frames. The weighting for resampling purposes may alternatively, or additionally, be based on auxiliary factors, such as a determined weather, lighting condition, geographic location, and the like.

According to certain aspects, rather than using dense, featureless points for fine-grained localization, combined with infrequent landmarks for global position, an embodiment may use recognizable landmarks to estimate the device position, subject to soft constraints introduced by the surrounding occupancy grid. For example, the grid/lane representation may be useful for determining that a driver is in the first lane or the second lane, but not so useful at determining his position along the street (along the direction of the lane line) particularly for straight lanes. In this regard, lane data may be a useful constraint for particle filter resampling. Likewise, when lane lines are not reliably detectable, the system may automatically rely more heavily on GNSS-INS fused with wheel-odometry. In some cases, these estimates may be further constrained by visible landmarks.

While the above disclosure may be used to implement a mapping and/or localization system that may avoid costs associated with a LiDAR and/or radar sensor, the incorporation of other sensors, including LiDAR and radar are also contemplated.

In some embodiments, LiDAR information may be incorporated. For example, LiDAR may reduce uncertainty associated with the range estimate to a detected visual object. In another example, LiDAR measurements may augment grid occupancy determinations as discussed below.

Similarly, radar signals may be incorporated. For example, radar signals may help determine a distance to certain visually detected objects and/or to certain road boundaries. For example, radar signals may provide information regarding the distance to curbs at a road boundary.

While certain aspects of the present disclosure are described with respect to a monocular camera system, multiple cameras may be used. In one example, a second camera may be pointed to the side of the vehicle. Side cameras may, for example, provide improved range estimates for static objects that the vehicle passes by. One benefit of side cameras is that detected road signs and the like may pass across a large portion of the camera's field of view, which may aid in localization of the object.

In one contemplated embodiment, objects are localized relative to the vehicle path from multiple deep learning detections with a monocular camera. At every time a particular object is detected, the bearing is stored. The bearings are combined with the location, heading and attitude (pose) of the vehicle (from the SLAM algorithm) at the time of each detection. From this, a vector can be computed that points along the direction of the object in world coordinates. The object location is estimated by finding the point in space that minimizes the distance from all lines (the "best fit intersection"). Additionally, a RANSAC or weighted best fit can be used to improve the estimate. Additionally, the position estimate can be updated and refined either in real-time or during post-processing as the detections are made. In this way, it is possible to localize an object with an initial, inaccurate estimate that is improved as additional information (more bearing vectors) is incorporated. The uncertainty in the estimate can be estimated, for example, by computing statistics on the distances from the point P (estimated object location) to the nearest point on each line Improvements to Self-Reported Error of GNSS Because all sensors have some noise, one challenging issue in sensor fusion relates to how a system should balance signals that disagree. In other words, how should the system balance what GNSS is telling the device with what odometry is telling the device.

As referenced above, some SLAM methods may incorporate error estimates of each sensor into a Kalman filtering algorithm. A GNSS module may report an estimate of its own error, which may then be used in an EKF to weight the evidence from the GNSS module with the other sensor data which may be more or less certain.

In practice, however, some GNSS modules may report a poor estimate of its own error. That is, sometimes GNSS does not know that its error is as bad as it is. This issue may be particularly pronounced in consumer grade GNSS devices such as may be incorporated into smartphones and the like. Since GNSS error may be inaccurately reported by the GNSS itself, the EFK may be consequently affected. Utilizing the self-reported error in some situations will not help, and could actually hinder a mapping and/or localization system. To our knowledge, the problem of inaccuracies in the error reporting of consumer grade GNSS modules is not addressed in prior literature or existing systems.

According to certain aspects, an enabled system may detect that GNSS error reporting has become transiently unreliable. For example, using wheel odometry it may be determined that a car has either come to rest or (with less likelihood) that it is skidding along the road. Cars typically come to a complete stop at red lights for example. When the vehicle is stationary, the GNSS module may continue to report changes in position. For example, the GNSS module may report that the vehicle has moved 10 meters over the course of a few seconds, with an error of 5 meters, even though the wheel odometry reports that the vehicle has not moved at all. In such a situation, the GNSS is not only inaccurate (10 meters off), but its estimate of its own accuracy is too confident. If the GNSS had reported an error estimate of 12 meters, for example, then the true location of the vehicle would be within that error. Since it reported an error of 5 meters however, there is now the potential for an unresolvable discrepancy between GNSS-INS position and the wheel odometry measurements. Likewise, observed visual objects may be mis-localized at the same time. While the above example referenced the GNSS alone, the GNSS-INS may also be expected to fail in these situations given that IMU sensor tends to drift over short time-periods, such that they cannot be relied upon to distinguish between a stationary and a slow-moving vehicle.

Continuing with the present example, GNSS may be inaccurate when the vehicle is stationary. When the vehicle is stationary, the wheel odometry signal will be static. Accordingly, the system may determine that any GNSS signal drift that occurs at these times may be ignored. This may occur even at times when the reported error of the GNSS device is low. As described, the IMU sensors may not be sufficiently accurate to detect that the GNSS has lapsed.

GNSS tends to be particularly poor when slowing down to an intersection and/or turning. At these times, there are frequently many IDMS-relevant salient landmarks. These can be used to determine an estimate of position.

In addition to contributing measurements with a lower error bound, and then letting the EKF fuse these data with GNSS measurements, discrepancies between vision based and/or wheel based odometry in this regime (when there are at least a certain number of landmarks visible, some confidence threshold) can actively overrule the GNSS. Either the GNSS may be ignored for these time periods and/or the reported GNSS error may be scaled up so that the EKF is less affected by the GNSS measurements.

When the GNSS disagrees with the other sensors by a certain amount, the system may then increase the error of the GNSS so that the EKF can effectively ignore it.

In addition, according to certain aspects, better temporal alignment of visual and inertial data may give higher confidence in vision/IMU/odometry based relative and position estimates, as described below.

Height Estimation of Visual Landmarks Using Topographic Information

It is well-known in the art that a GNSS module may provide a poor estimate of height. This may cause an issue for mapping in a hilly area.

If coming down a hill, traffic lights may be below the vehicle, even though the traffic lights are suspended above the road. In this example, a lack of knowledge about the topography of the road, could lead to estimates that stop lights are below the road, but when the device approaches the intersection, the traffic lights may be above it. For this reason, among others, it may be desirable to map the height of a road in addition to the locations of markings on its surface. In practice, however, a full three-dimensional model of road surfaces may be too unconstrained to be practically solved.

According to certain aspects of the present disclosure, satellite-based national cm-level topographic info may be utilized. When doing the mapping, an enabled system may incorporate height information from this database. A first GNSS measurement, or preferably a trajectory, may provide a lat/long that can then look up the topographic height at those points.

Government data is available over the entire US every but at that 10 m point, the accuracy is a few centimeters in height. According to certain aspects, an enabled system can retrieve a set of lat-lon points (a path). A boundary around the path with a given thickness may be used to look up heights. A grid interpolation algorithm may then be used to interpolate onto that path. In some cities, the available topography data is resolved at a higher resolution. For example, in San Diego, there is 1-m resolved topography data available based on LiDAR readings from aerial vehicles. That is, data are available that provide the height of a given square meter of the road.

By using this 3D information from an independent source, the mapping process can operate under a simplifying assumption that the road exists on a 2D road plane, with the camera or cameras are a substantially fixed height above that plane. Accordingly, objects that are detected may still accurately determined 3D positions (in the 2D plane plus a height). In some embodiments, mapped objects may also have roll, pitch and yaw. As discussed below, objects may also have semantic labels and/or probabilities.

Mapping of Static Objects with Semantic Labels and Crowd-Sourcing Considerations According to certain aspects, a map of landmarks may include labels having a semantic meaning. Semantic meaning may be enabled because the system makes use of detected visual objects, such as objects having a behavioral relevance in the context of a behavioral monitoring application.

Semantic labels may have an impact on the efficiency of data transmission, that is determining what should be transmitted from an edge computing device to a cloud server. In one embodiment, bounding boxes of detected objects may be transmitted along with a semantic label. Alternatively, or in addition, an estimate of the location of the identified object may be transmitted to a cloud server. In some applications, stationary objects may be prioritized with respect to moving objects for the purposes of mapping. For example, data relating to detections of static objects may be used for bundle adjustments in the cloud.

According to certain aspects, SLAM approaches may be leveraged to crowd-source and quickly update for accidents, road construction, and other changes.

Another aspect herein disclosed for the first time relates to a determination of a behavioral map. For example, based on a determined trajectory and a determined positon of a stop sign or a traffic light, a system enabled with certain aspects of the present disclosure may determine where drivers typically come to a stop at an intersection. This inference may be useful for determining a controller of an autonomous vehicle to drive in a more human-like manner.

Similarly, certain aspects may be applied to determine how drivers behave in road-merging situations, roundabouts, and the like. Furthermore, certain aspects may be utilized to determine patterns of pedestrian interactions.

Time Interpolation of Objects Detected in Visual Data

According to certain aspects, visual data frames may be synced to sample time points of inertial sensor data. For example, according to certain methods disclosed herein, a visual object may be detected and in successive frames. Each frame may have a timestamp corresponding to the time that it was captured at the camera sensor. In some embodiments, the visual data frames may be captured at 30 frames per second. The inertial sensor data may be captured at 100 samples per second. The sample times of an inertial sensor and the camera sensor may not always align. The offsets of these timings may then become an additional source of error for mapping and localization purposes. That is, with poor time alignment of the camera and inertial sensor, an enabled system may attempt to fuse visually observed features that were captured at a given location but recorded as if they were captured at a slightly different location. The offset will depend on the speed of the vehicle, which may be especially problematic for vehicles traveling at high speeds.

According to certain aspects of the present disclosure, bounding boxes of successively captured frames may be used to interpolate a position of a hypothetical image capture at a sampling time of the inertial sensor.

Certain aspects of the present disclosure provide a method comprising receiving first visual data captured at a first time by at least one camera associated with a vehicle; identifying a stationary object from the first visual data; receiving inertial data captured at a second time by a sensor associated with the vehicle, wherein the second time is subsequent to the first time; receiving second visual data captured at a third time by the at least one camera, wherein the third time is subsequent to the second time; identifying the stationary object from the second visual data based at least in part on a spatial location of the stationary object within the first visual data and the second visual data; determining an estimated spatial location of the stationary object at the second time, based at least in part on the spatial location of the stationary object within the first visual data and the second visual data, the first time, the second time, and the third time.

In one example, a gyroscopic data stream may be sampled every 10 milliseconds. A visual stream may be sampled every 33 or 34 milliseconds and may have sampling jitter of tens of milliseconds. A first image frame may be captures at time point corresponding to 980 milliseconds. A second image frame may be captures at a time point corresponding to 1013 milliseconds. A static traffic sign, such as a stop sign may be observed in both image frames, although in slightly different locations in the image frame due to movement of the vehicle to which the camera is affixed. Concurrently, accelerometer data may have been captured at 980 milliseconds, 990 milliseconds, 1000 milliseconds and so on. In this example, the first video frame and the first accelerometer sample were captured within 1 msec of each other, both having a timestamp of 980 milliseconds. For the purpose of determining the location of the stop sign at the time of the first accelerometer sample, the detection determined in the first visual data frame may be used as is.

For the accelerometer recording at 990 milliseconds, the position of stop sign in the visual data may be inferred from the detections in the first and second frame. Since the timestamp is closer to the first data capture instead of the second, the weighting of the position information from the first data capture may be higher than the weighting of the position information from the second data capture. In some situations, however, based on additional considerations, the weighting may be different. For example, if the vehicle came to a complete stop between 980 and 990 milliseconds, and then remained at rest, the inferred position of the vehicle would be closer to that associated with the image capture at 1013 milliseconds. In this case, the weighting may be based on the inferred position instead. Depending upon the accuracy of the sensors being used, a purely time-based interpolation scheme may reflect a desired tradeoff between accuracy and computational complexity.

Driving Behavioral Analysis and Crowd-Sourced Mapping

Driver Pattern Analysis provides fleets with a comprehensive map view of how their drivers are driving by geography. A Driver Pattern Analysis mapping feature may recognize and cluster specific driver behaviors which represent favorable or risky situations for the driver, the fleet, the general public, and the like. This enables a safety manager to review and evaluate identified risk areas and modify fleets operations to increase safety.

Driver Pattern Analysis may include a data visualization tool for communicating specific risks that a fleet encounters. Examples of risks that may be associated with certain geographic areas include: heavy traffic congestion, reduced following distance, dangerous intersections, speed of traffic, variability in traffic speeds, and incidents of vehicle damage. Geographic areas may also be associated with positive indicators of driving behavior, such as a location in which drivers tend to slow down to let merging drivers complete a lane change, and the like. A 'risk' map may help fleets identify and prioritize the risks associated with their business.

Existing driving safety technologies may only collect data based on inertial event "triggers" and may therefore be too sparse and/or biased for all but the most severe indicators of geographic risk analysis. For example, inertial sensor triggers may be used to identify geographic locations having atypically high occurrences of collisions.

Continuous analysis of visual data, in contrast, may reveal locations that are predictive of a collision without having to wait for an accumulation of collision data. Such analysis may be especially useful to identify problematic areas having infrequent and transient surges in collision risks, such as areas near a sporting venue, a large high-school, and the like. Collision risks, for example, may be associated with geographic locations at which drivers tend to drive close to each other, tend to change lanes frequently, and the like, and that may therefore pose a risk of collision.

FIG. 2 illustrates a coordinate system that may be utilized in a system for mapping traffic boundaries. The coordinate system may originate at a location of a driver monitoring device that may be coupled to the windshield of a truck.

Figure 3:
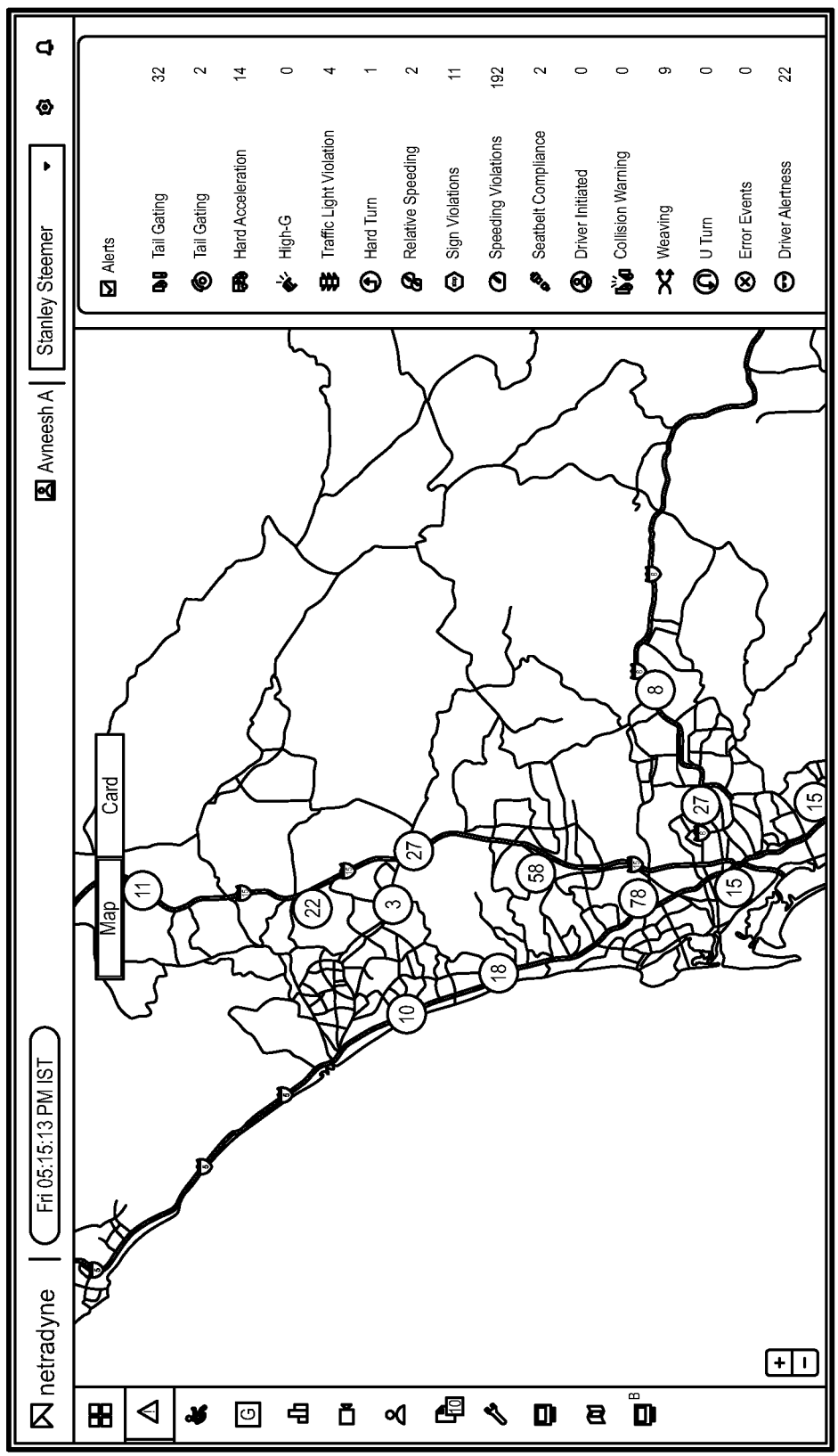
FIG. 3 illustrates an example of a system of mapping behavioral alerts in accordance with certain aspects of the present disclosure.

FIG. 3 illustrates a web portal that may display the locations from which different driver monitoring events were detected with a Driveri™ device. The device may capture and analyze substantially every minute of every driving hour.

Figure 4:
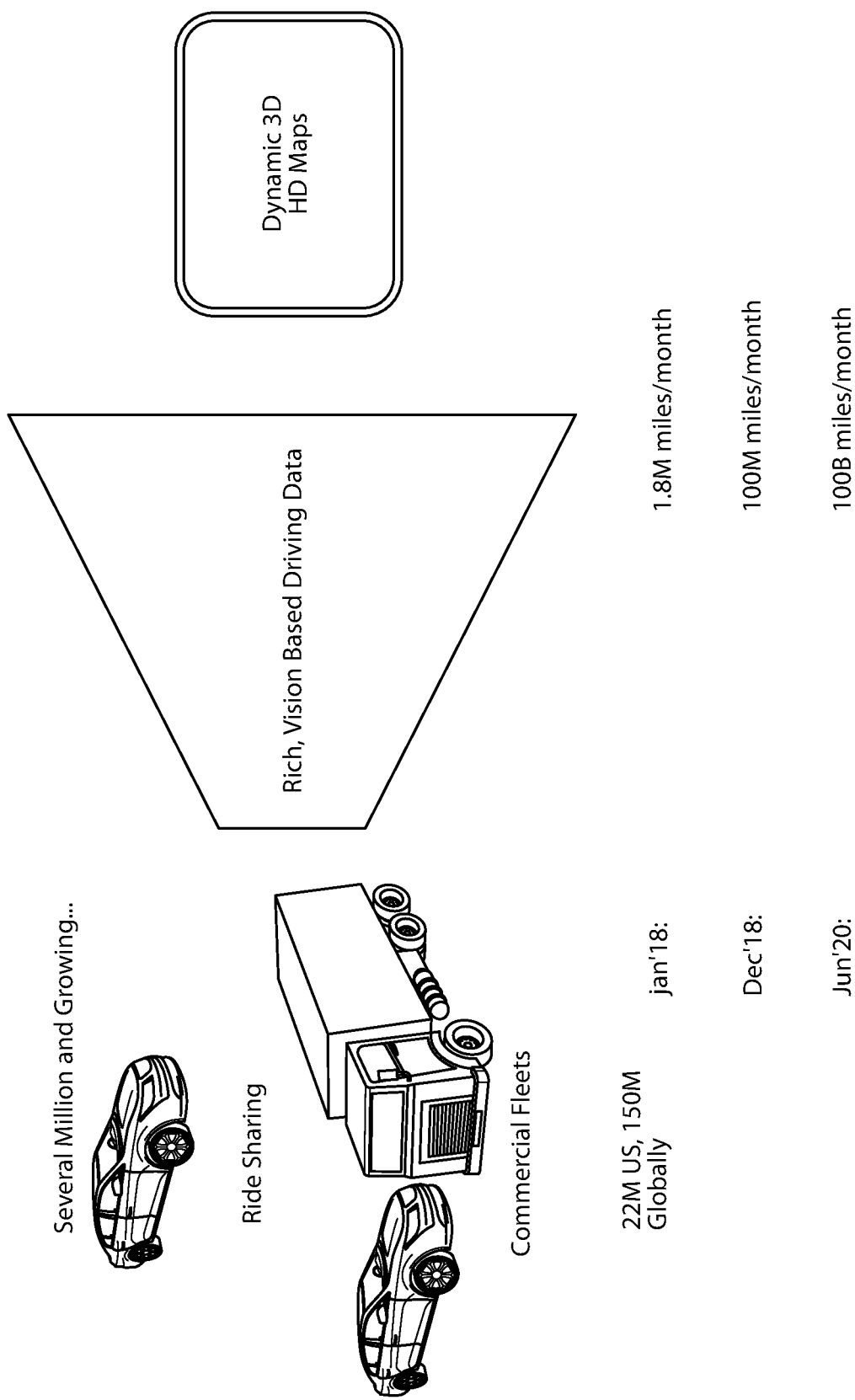
FIG. 4 illustrates an example of a device configured to map traffic boundaries in accordance with certain aspects of the present disclosure.

FIG. 4 illustrates how devices installed on a heterogenous assortment of vehicles may contribute to a crowd-sourced map, in accordance with certain aspects of the present disclosure.

Figure 5:
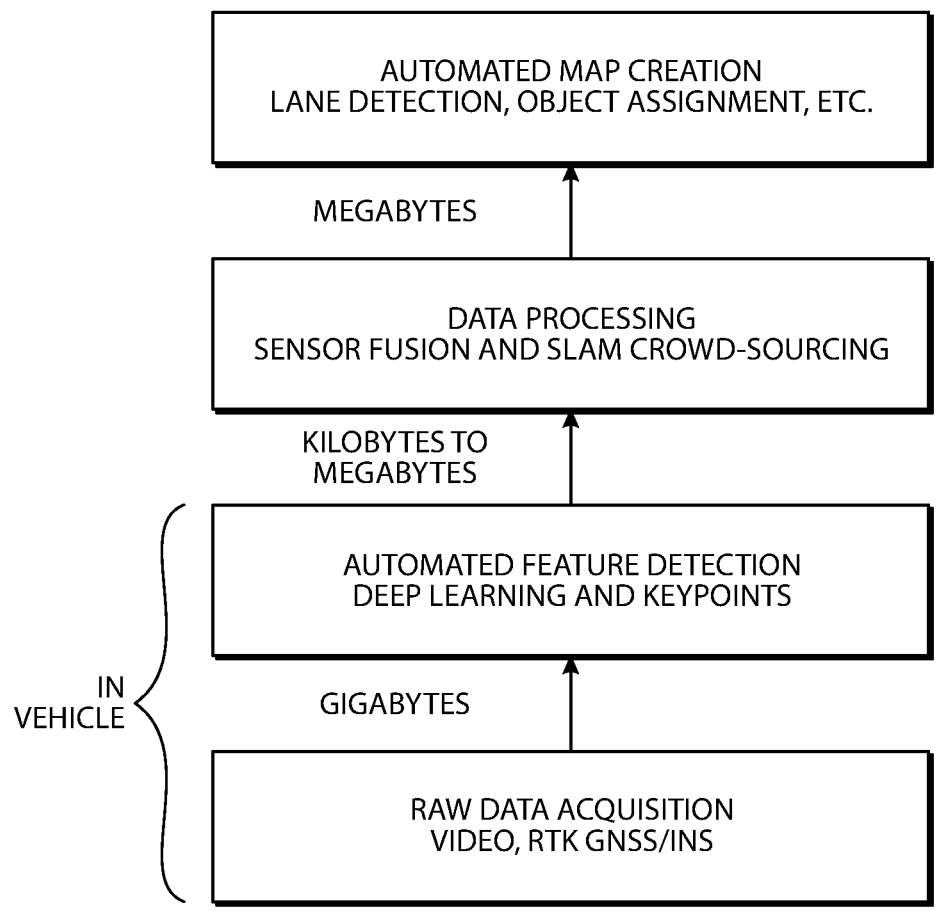
FIG. 5 illustrates an example of a system or method configured to map traffic boundaries in accordance with certain aspects of the present disclosure.

A conventional method for creating cm-accurate 3D maps (HD maps) may use a Mobile Mapping System (MMS) vehicle with expensive LiDAR and camera sensors. These sensors may collect a very large amount of point cloud data, on the order of terabytes. Due to the volume of data, it may consume large computing resources to process. For this reason, the collected data may be transferred for further processing after the vehicle returns to the garage. Then, the map may be drawn from the point cloud data using a predominantly manual scribing process According to certain aspect of the present disclosure, as illustrated in FIG. 5, video may be acquired and other sensor data may be processed on the device, in the vehicle, using deep learning. In this way, the semantic information, such as object and lane line detections, may be captured in the vehicle and uploaded over a wireless or cellular data link to the "cloud" servers. In contrast to the MMS system described in the previous paragraph, the on-device processing may reduce the data to a summarized form that is sufficient for mapping but may be substantially reduced in complexity and size. In this way, it may be economically and rapidly uploaded over wireless links for map generation. Once the data is uploaded, it is processed through sensor fusion and Simultaneous Localization and Mapping (SLAM) algorithms in order to update a crowd-sourced map with a lower level representation (e.g. occupancy grid and object detection information). Finally, a set of algorithms is applied to the lower level map data to produce a map such that it is in a form suitable for human or machine use. These algorithms include, for example, an algorithm that deduces lane line paths from the occupancy grid, and another that associates all road information with a topological basemap for routing and navigation.

Figure 6:
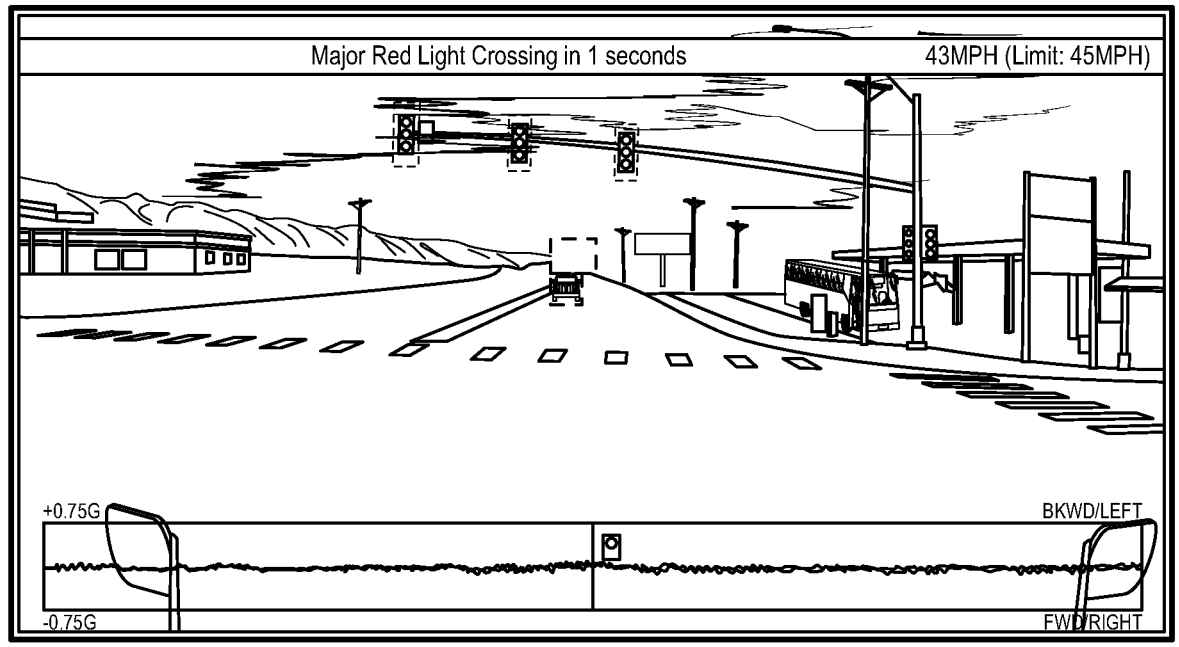
FIG. 6 illustrates an example of a device configured to map traffic events and traffic boundaries in accordance with certain aspects of the present disclosure.
Figure 6:
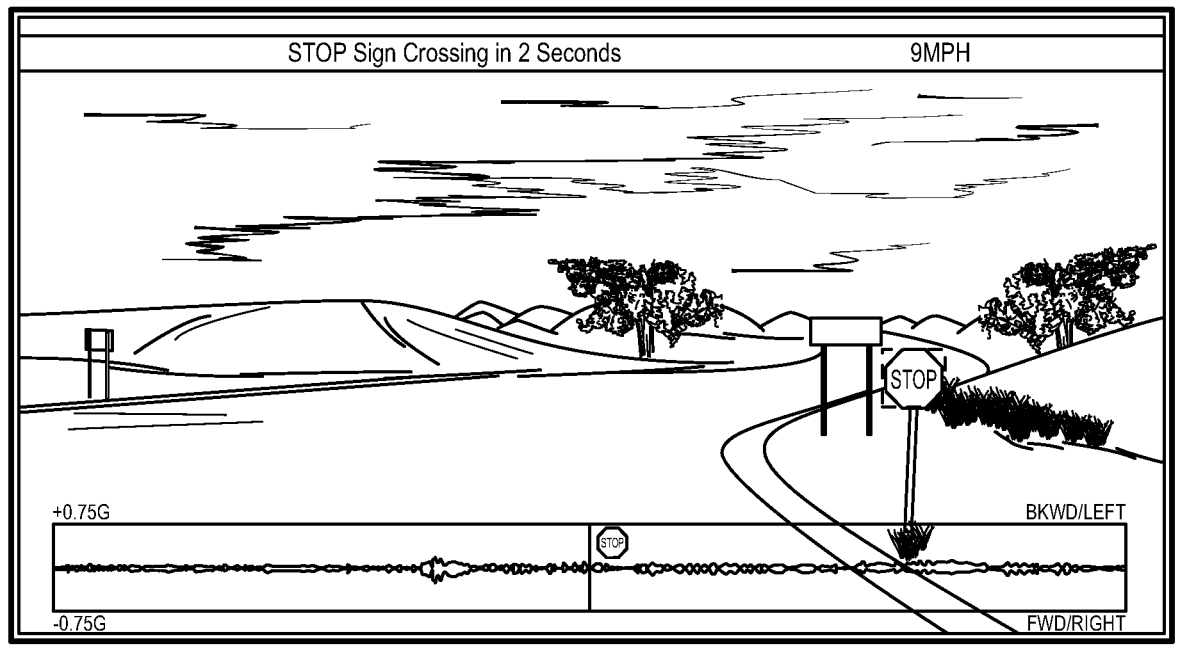

FIG. 6 illustrates two examples in which real-time, or substantially real-time edge computing may automatically analyze a visual scene surrounding a vehicle. The top panel illustrates detected traffic lights. The bottom panel illustrates a detected stop sign.

Figure 7:
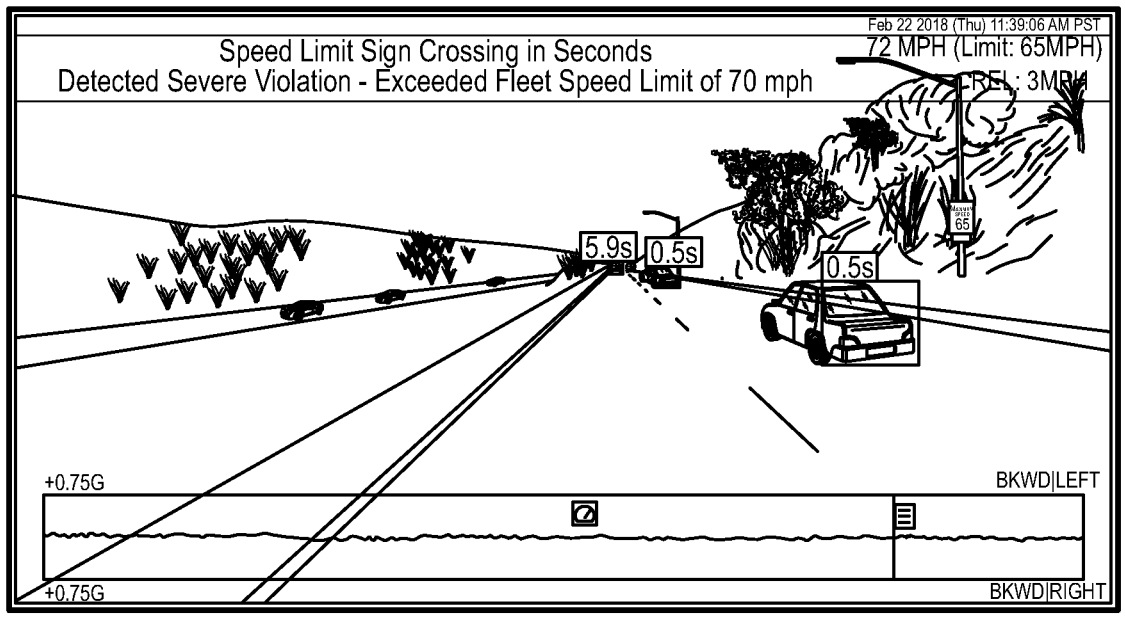
FIG. 7 illustrates an example of a device configured to map traffic events and traffic boundaries in accordance with certain aspects of the present disclosure.
Figure 7:
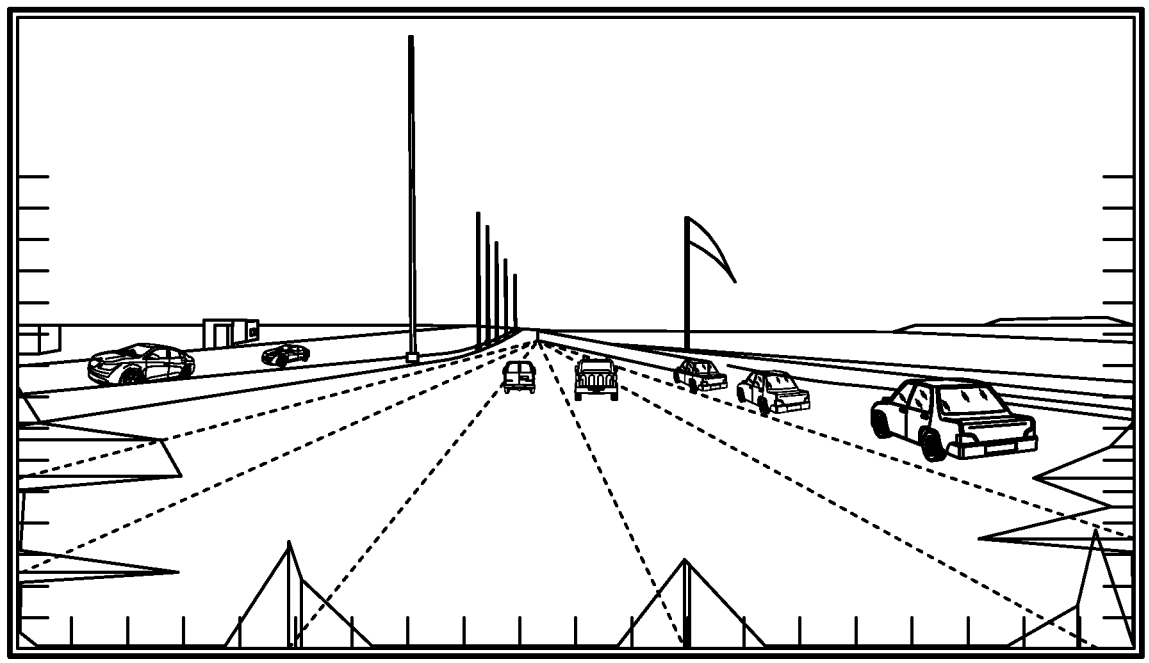

FIG. 7 illustrates two examples in which real-time, or substantially real-time edge computing may automatically analyze a visual scene surrounding a vehicle. The top panel illustrates detected vehicles and a detected speed limit sign. The bottom panel illustrates a detected lane lines, including road boundaries. In the bottom panel, the heights of jagged lines surrounding the bottom three-fourths of the image reflect a likelihood of the presence of a lane line at a corresponding bin.

Figure 8:
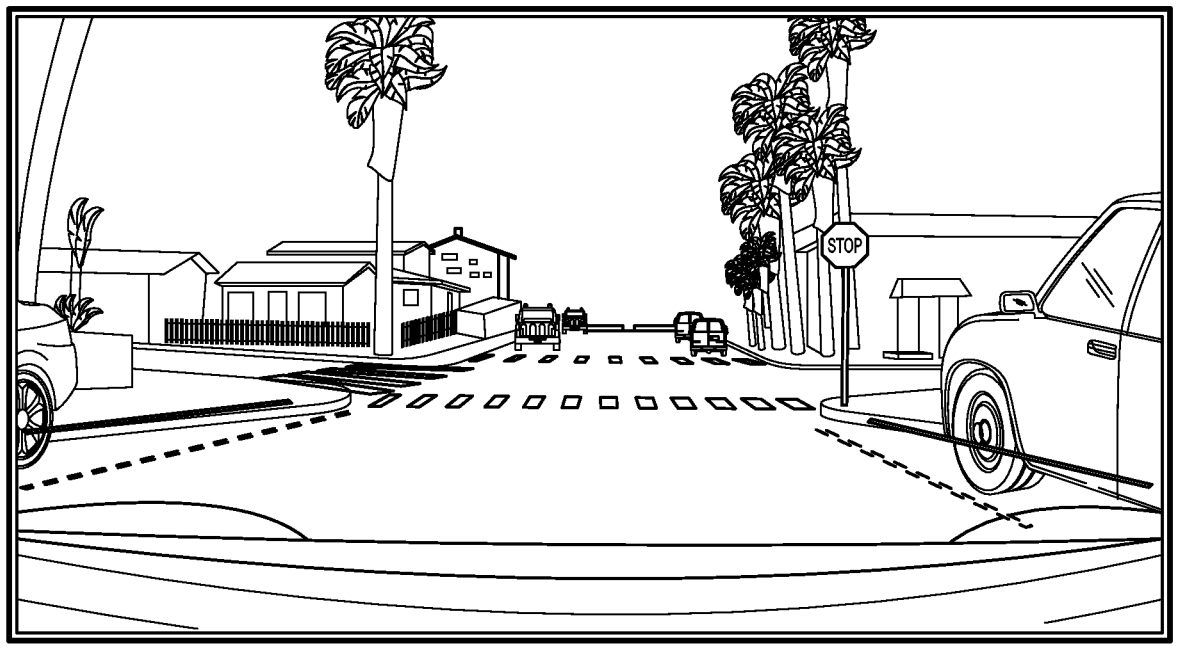
FIG. 8 illustrates an example of a device configured to map traffic boundaries in accordance with certain aspects of the present disclosure.
Figure 8:
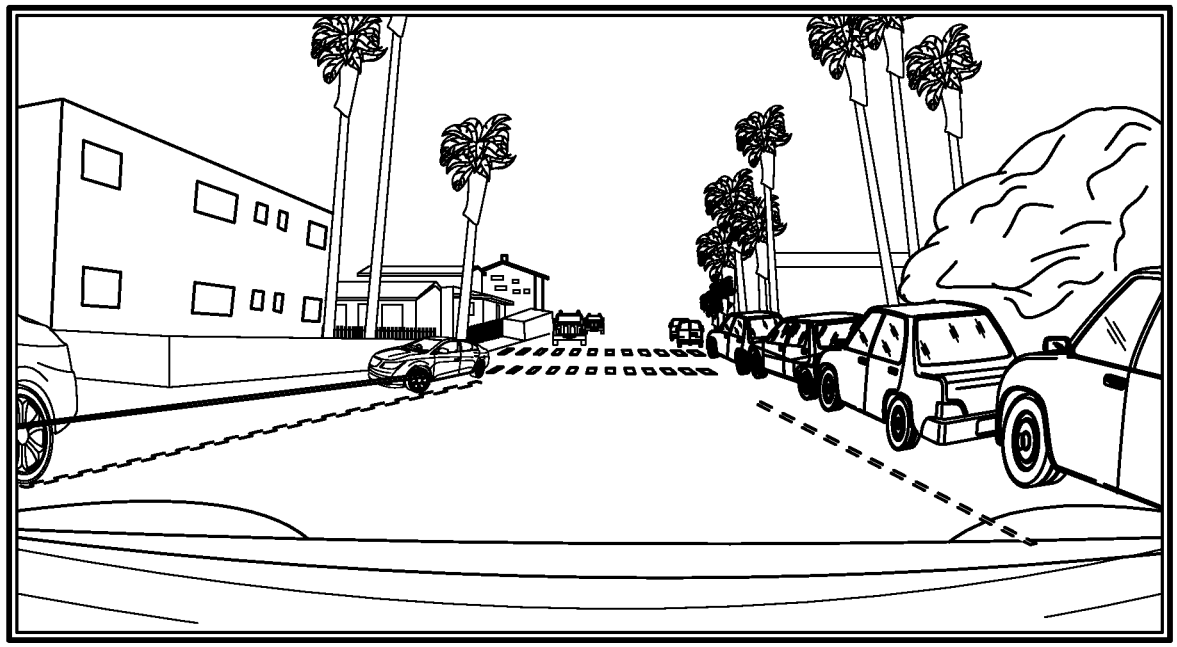

FIG. 8 illustrates two images captured by a camera affixed to the vehicle. In this image inferred lane boundaries are indicated with dashed lines. There are no road markings corresponding to the inferred lane boundaries. Instead, the inferred boundaries are defined with respect to a row of parked vehicles. According to certain aspects of the present disclosure, a neural network may be trained to identify such inferred lane boundaries based on human annotations of high level concepts, such as a boundary of parked vehicles.

Figure 9:
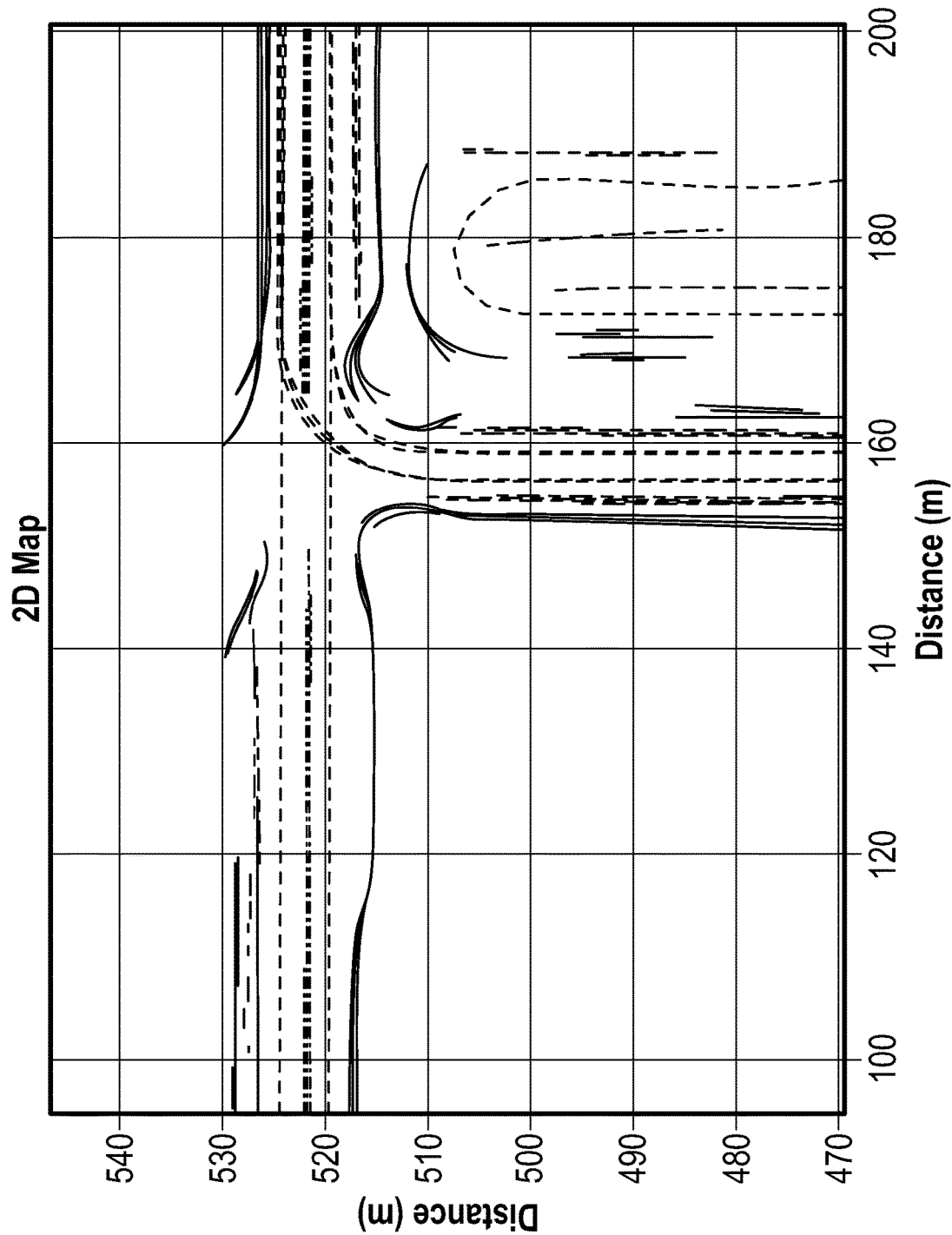
FIG. 9 illustrates an example of system to map traffic boundaries in accordance with certain aspects of the present disclosure.

FIG. 9 illustrates an example of deep learning-based traffic boundary map. In FIG. 9, the narrow, elongated dashed lines indicate the trajectory of a vehicle. The crossed dashed lines represent portions of an occupancy grid where an inferred lane was detected. The smooth lines represent portions of an occupancy grid where a road boundary (curb) was detected. The heavy dashed lines represent portion of an occupancy grid where a visible line was detected.

Figure 10:
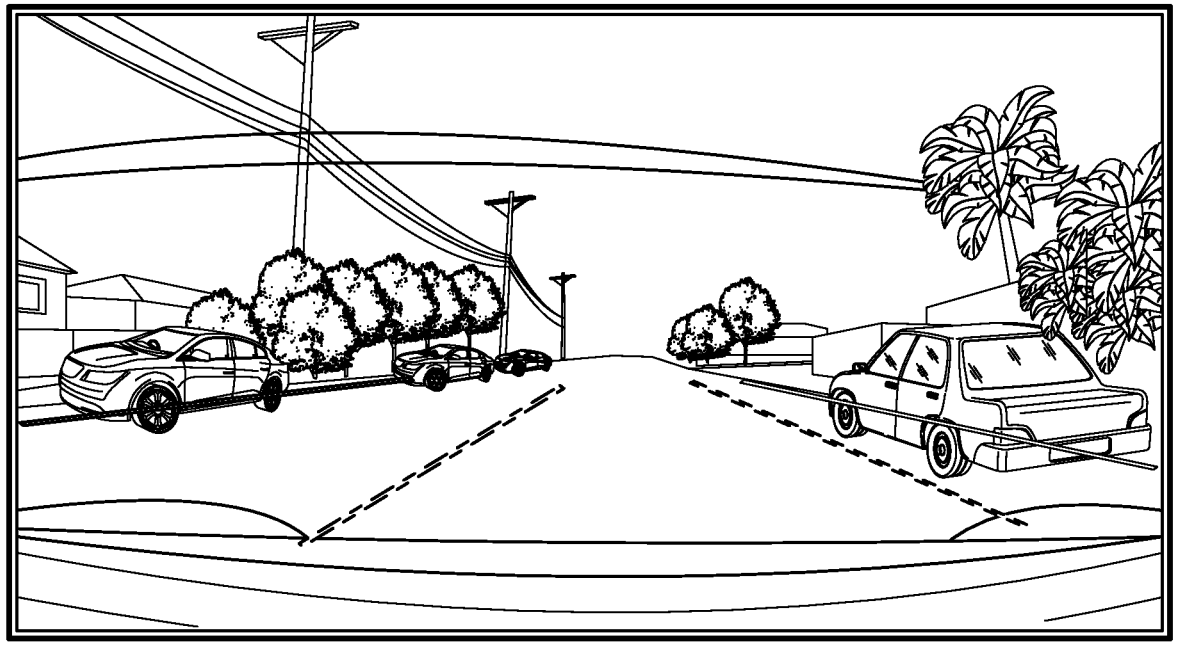
FIG. 10 illustrates an example of a system to map traffic boundaries in accordance with certain aspects of the present disclosure.
Figure 10:

FIG. 10 illustrates two images demonstrating inferred lane detections. The top image was collected by a device affixed to the same vehicle as was featured in FIG. 8 and FIG. 9. The bottom image was collected by device affixed to a class 8 truck.

Figure 11:
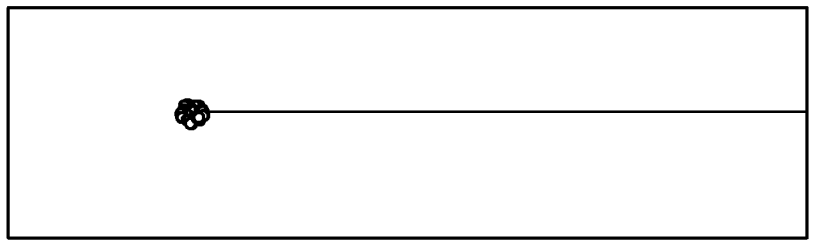
FIG. 11 illustrates an example of a system to map a location of a robot within a walled corridor.
Figure 11:
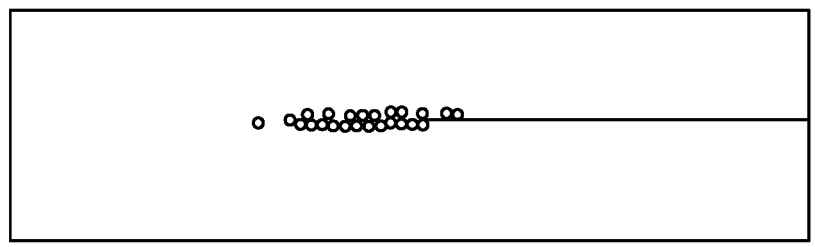
Figure 11:
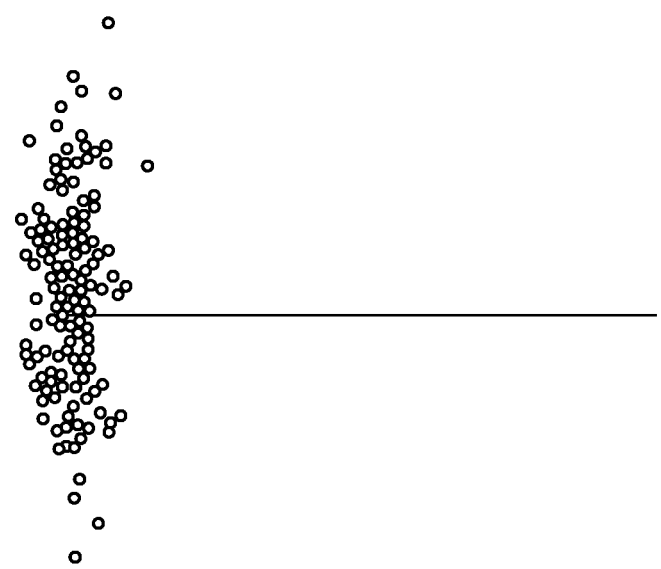

FIG. 11 illustrates an example from the prior art in which particles in a particle filter may be constrained according to interior walls of an office building as detected by a sensor affixed to a moving robot.

Figure 12:
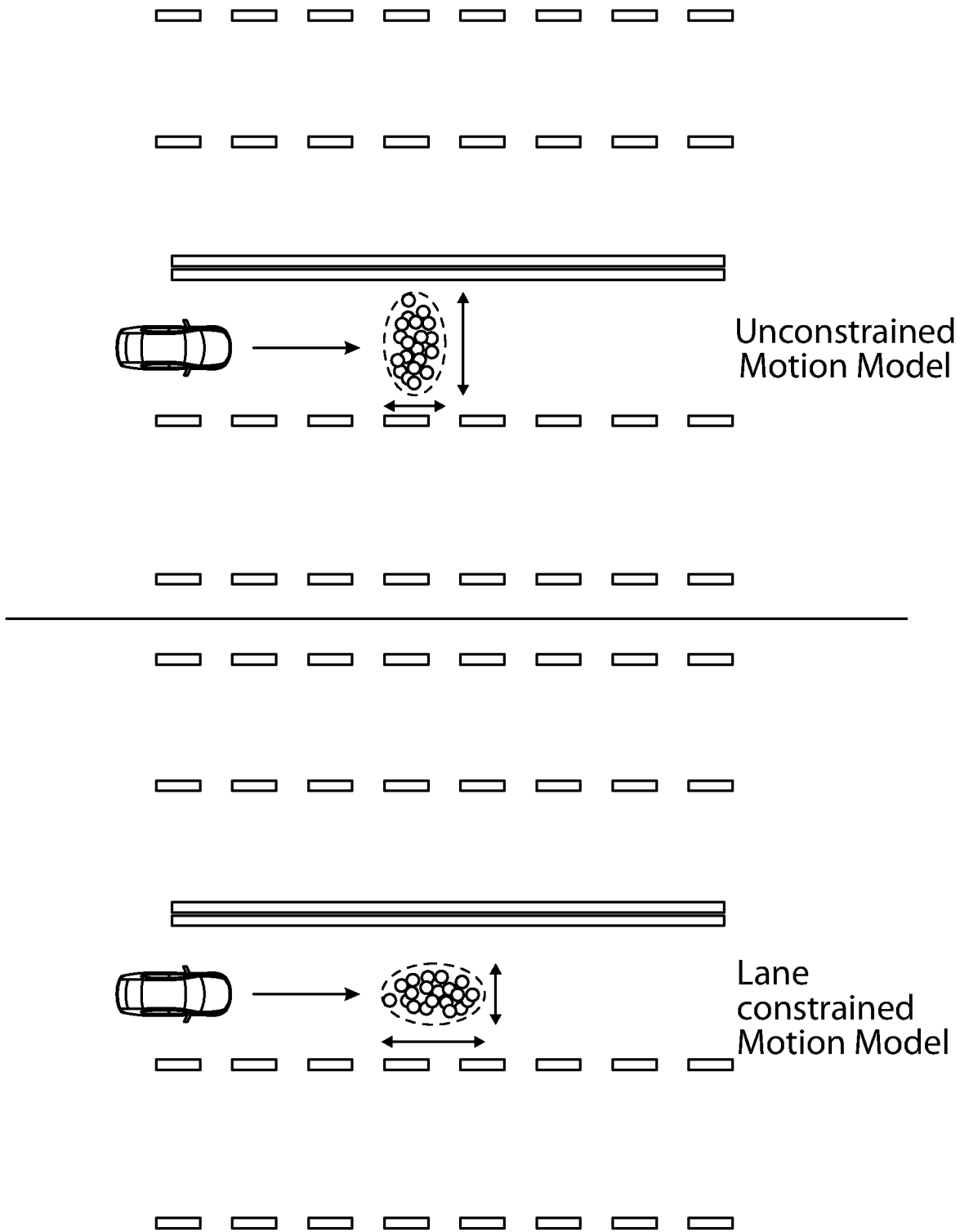
FIG. 12 illustrates an example of a device configured to map traffic boundaries in accordance with certain aspects of the present disclosure.

FIG. 12 illustrates an example of certain aspects of the present disclosure in which particles in a particle filter may be constrained according to detected traffic boundaries. Unlike the example illustrated in FIG. 11, the example illustrated in FIG. 12 reflects an outdoor environment. Further, the road boundaries are substantially flat on a surface of a road, rather than substantially perpendicular to a floor. Finally, the lane boundaries illustrated in FIG. 12 may be detected with a camera sensor with or without a separate range estimate sensor. The method illustrated in FIG. 12 may be referred to as a method of providing lateral constraints on a vehicle position based on detected lane boundaries.

FIG. 13 illustrates a sampling of the diversity of objects and traffic boundary categories that may be mapped in accordance with certain aspects of the present disclosure.

Figure 14:
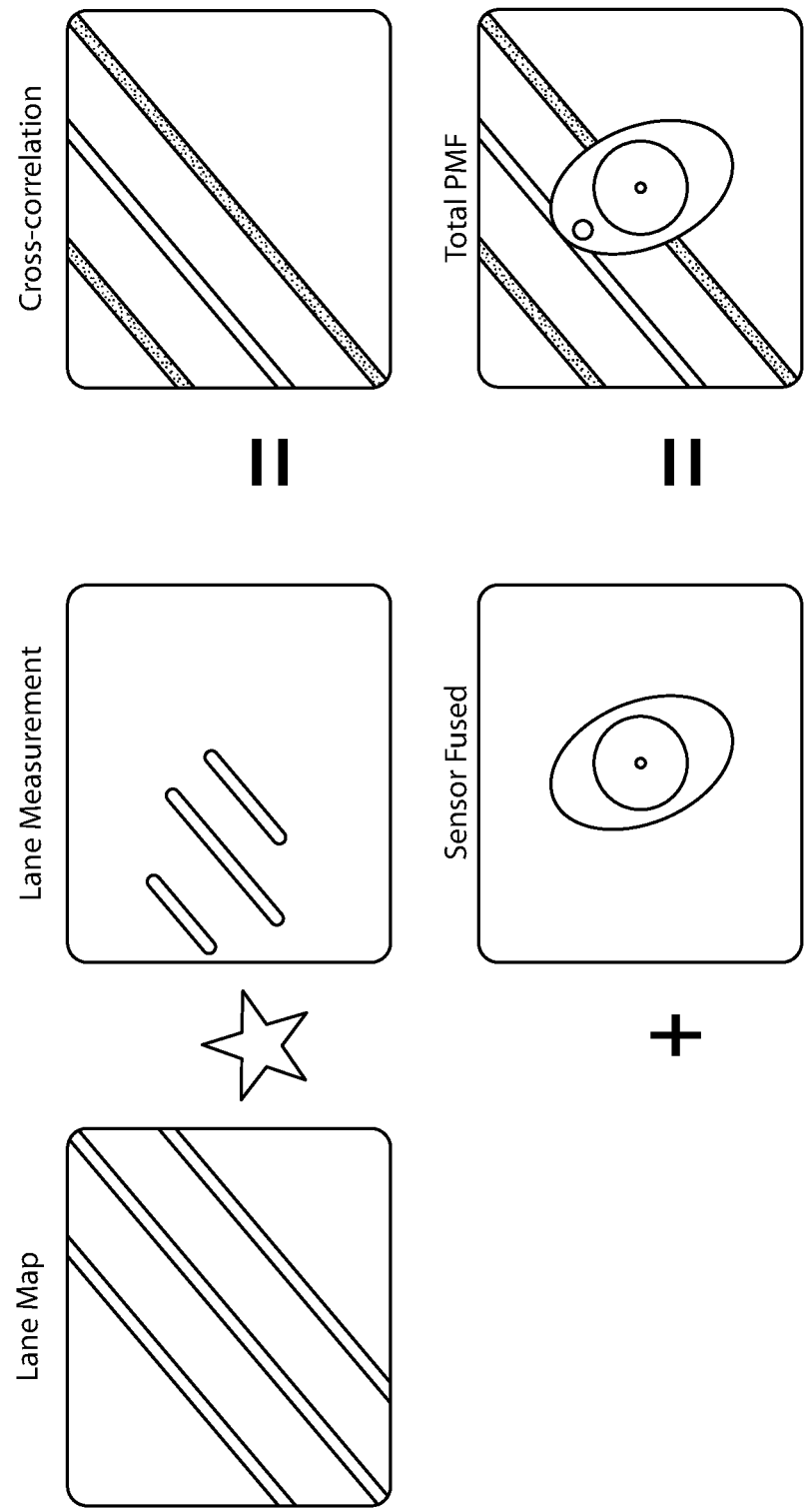
FIG. 14 illustrates an example of a system or method of mapping traffic boundaries in accordance with certain aspects of the present disclosure.
Figure 15A:
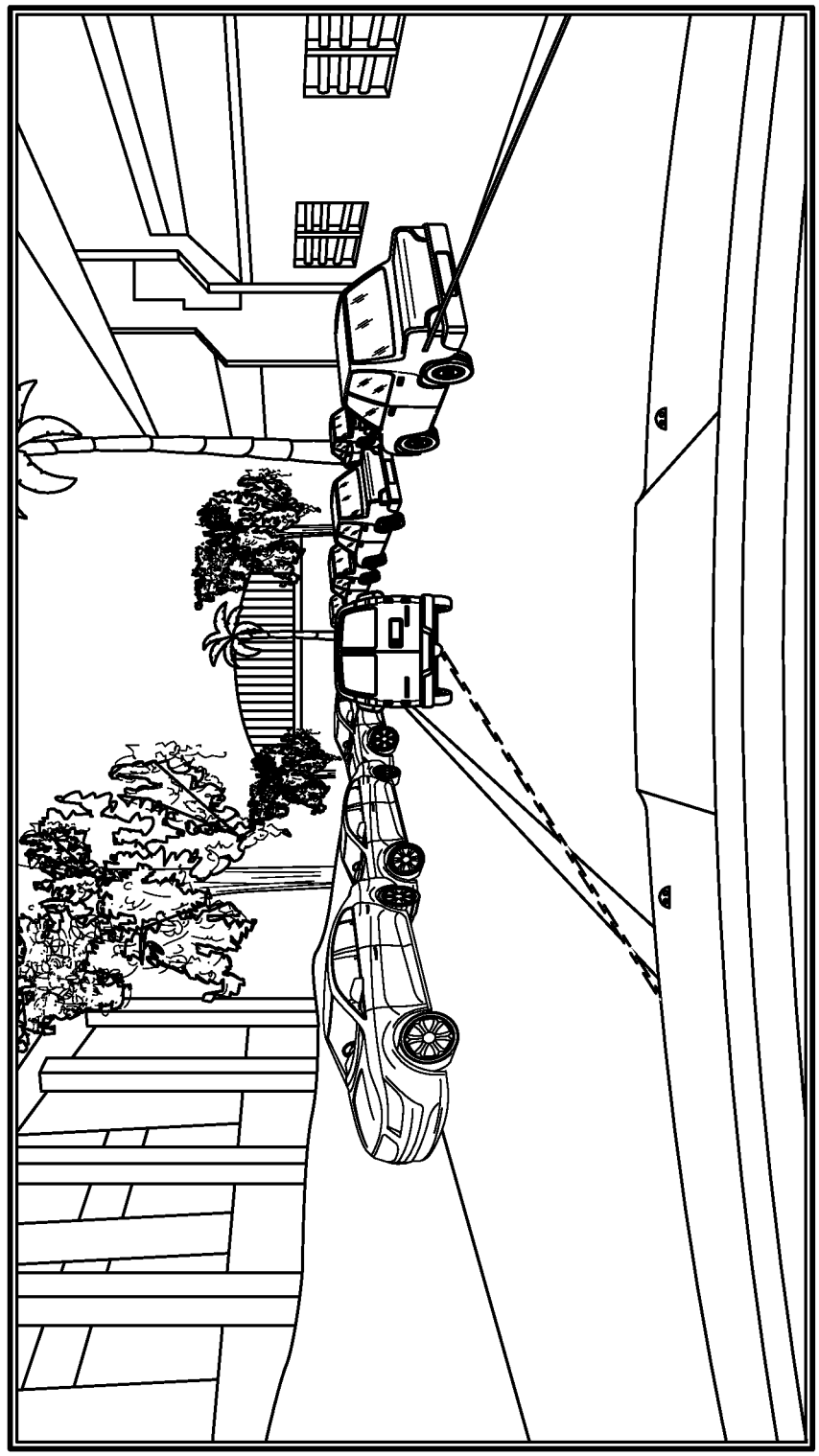
FIG. 15A illustrates an example of a device configured to map traffic boundaries in accordance with certain aspects of the present disclosure.
Figure 15B:
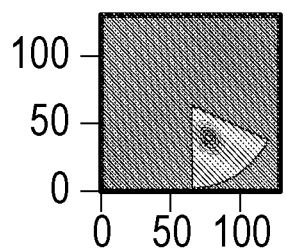
FIG. 15B illustrates an example of a system or method of mapping traffic boundaries in accordance with certain aspects of the present disclosure.
Figure 15B:
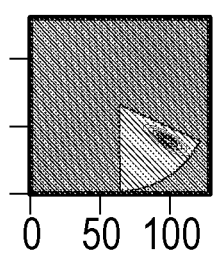
Figure 15B:
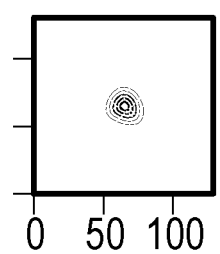
Figure 15B:
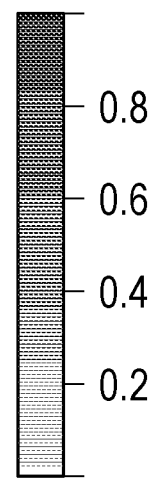
Figure 15B:
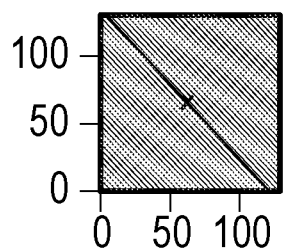
Figure 15B:
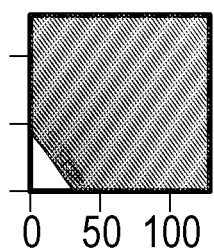
Figure 15B:
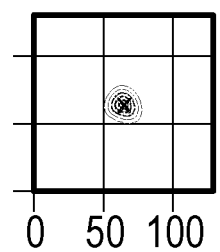
Figure 15B:
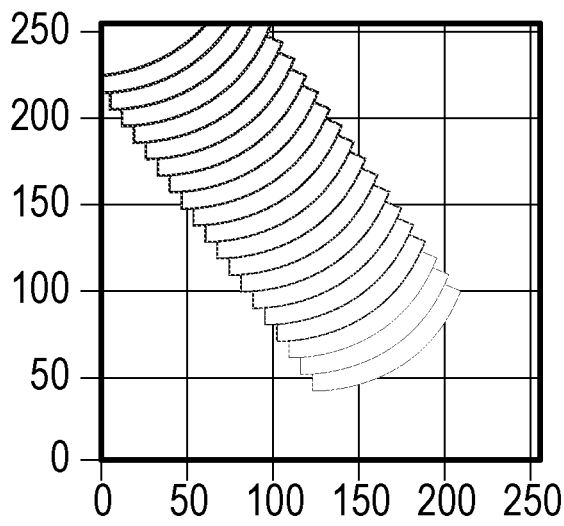
Figure 15B:
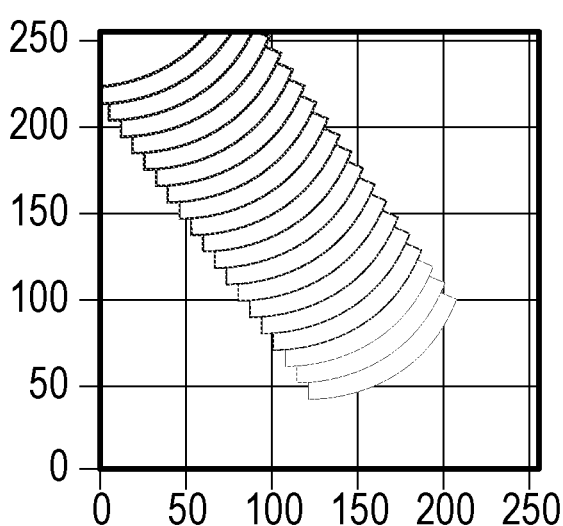

FIG. 14 illustrates an embodiment of certain aspects of the present disclosure that combines an occupancy grid, sensor fusion (GNSS-INS) and object detection information with probabilistic methods to estimate the position of a vehicle against a map. First, an existing "lane map" includes lanes, road boundaries, objects and other such spatial structures. The information in the map is represented as either Gaussian (or similar) analytic probability distributions with a mean and covariance or as an occupancy grid of independent cells (e.g. 10×10 cm size). The value of a cell may be the probability of the cell containing a particular structure, such as a lane line, road boundary, cross-walk, etc. Second, a measurement of the environment is acquired on the device via the camera and deep learning to produce occupancy grids and object localizations that are relative to the position of the vehicle. Third, the relative lane measurement grid is cross-correlated with the map, and suitably normalized, to produce a spatial probability distribution that quantifies the probability of the vehicle being located at every grid cell. Fourth, the lane and boundary cross-correlations are combined with the distributions for the sensor fusion (GNSS-INS) location estimate, and from object detections after association with the map (as in FastSLAM and EKF-SLAM), to produce a total probability mass distribution. Fifth, the vehicle location can then be estimated from the joint distribution by selecting either the maximum likelihood estimate, the expected value or some combination therein FIG. 15A and FIG. 15B provide a visual depiction of the occupancy grid SLAM process. Measurement occupancy grids, constructed from detected lane line and road boundaries and relative to the vehicle position, are separately constructed from the output of the deep learning and knowledge of the camera intrinsic and extrinsic characteristics. In addition, objects, such as a fire hydrant, are detected and localized with improved accuracy as multiple detections are combined. The object is then associated with its position and spatial covariance, as stored in the map, which provides a probabilistic constraint on the position of the vehicle which made the detection. In addition, the GNSS-INS navigation solution, represented as a Gaussian probability distribution with a mean and covariance, is also computed. The resulting probability distributions are jointly combined to form a "total PDF" which is used to localize the vehicle. Note, the cross-correlation of the measured lanes with the map occupancy grid can be performed in several dimensions, including north, south, heading angle, etc.

Figure 16:
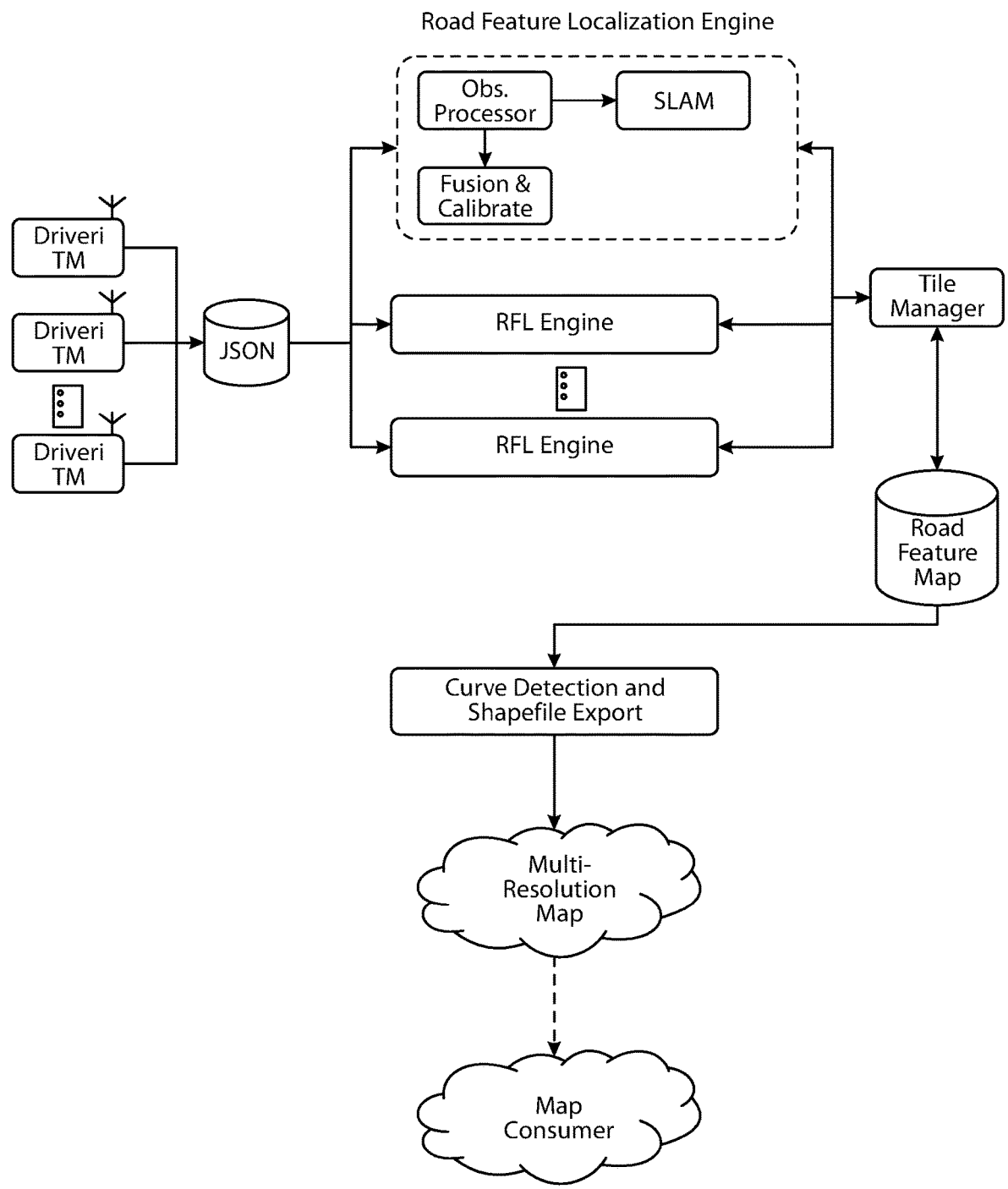
FIG. 16 illustrates an example of a system or method of mapping traffic boundaries in accordance with certain aspects of the present disclosure.

FIG. 16 illustrates a system of crowd-sourced mapping. Sensor data, after processing through deep learning on the device (which may be a Driven device), is uploaded over a wireless link to the servers (JSON). As the sensory recordings are uploaded, Road Feature Localization (RFL) Engines run in parallel to further post-process the data (e.g. GNSS-INS sensor fusion and sensor calibration) and update the lower level map data tiles via the SLAM algorithm. The resulting map is regularly generated by further processing the map tiles to perform automated map generation, such as detecting lane lines from the occupancy grid and associating the road features with a topological map for routing and navigation. The resulting map is then stored by updating a database which can be accessed by other users or map consumers.

Figure 17:
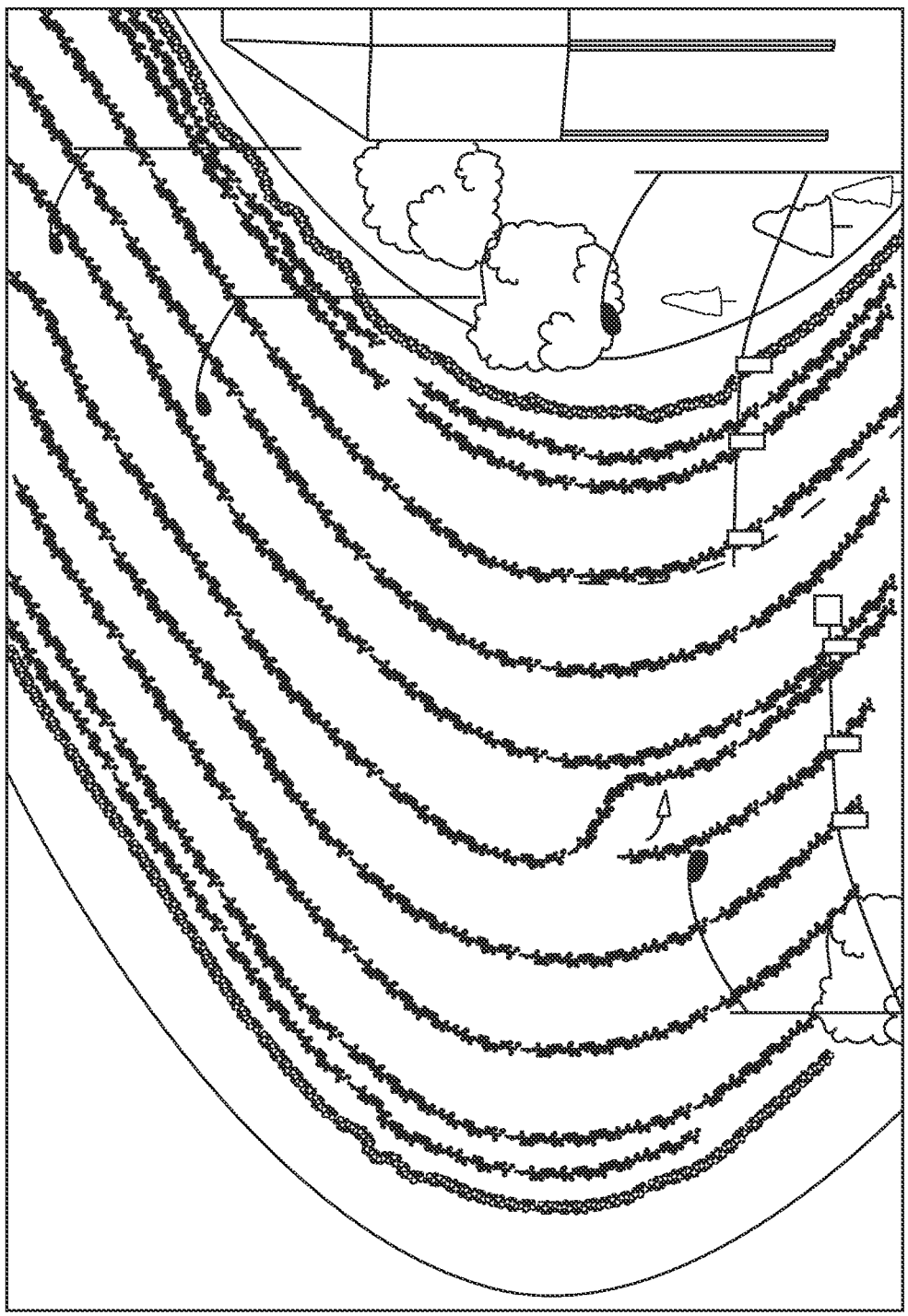
FIG. 17 illustrates an example of a system or method of mapping traffic boundaries in accordance with certain aspects of the present disclosure.

FIG. 17 illustrates one aspect of automated map generation from the lower-level occupancy grid map includes road boundary and lane line path detection. Since an occupancy grid is a regularly spaced, discrete array (e.g. 10×10 cm) of cells, it does not directly capture the continuous and ordered nature of a path, as such features on a map are customarily represented. However, continuous and ordered paths are constructed automatically from the occupancy grid to form, for instance, splines that can be associated with the road network. This is done with an algorithm that intelligently detects and draws paths that are consistent with the road features, through a process of automated map generation.

Figure 18:
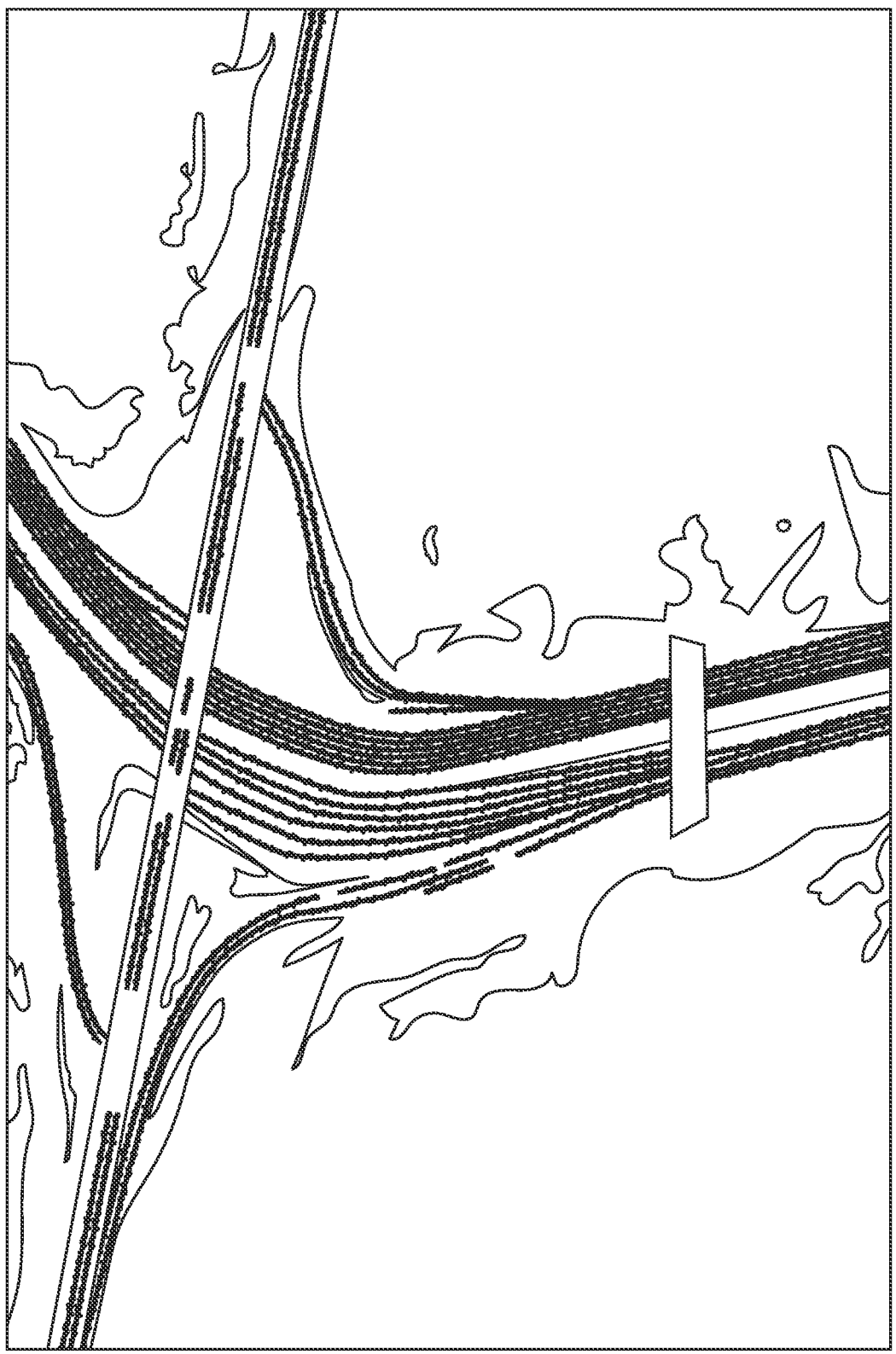
FIG. 18 illustrates an example of a system or method of mapping traffic boundaries in accordance with certain aspects of the present disclosure.

FIG. 18 illustrates a larger span of mapped traffic boundary locations that includes off-ramps and an overpass.

Figure 19:
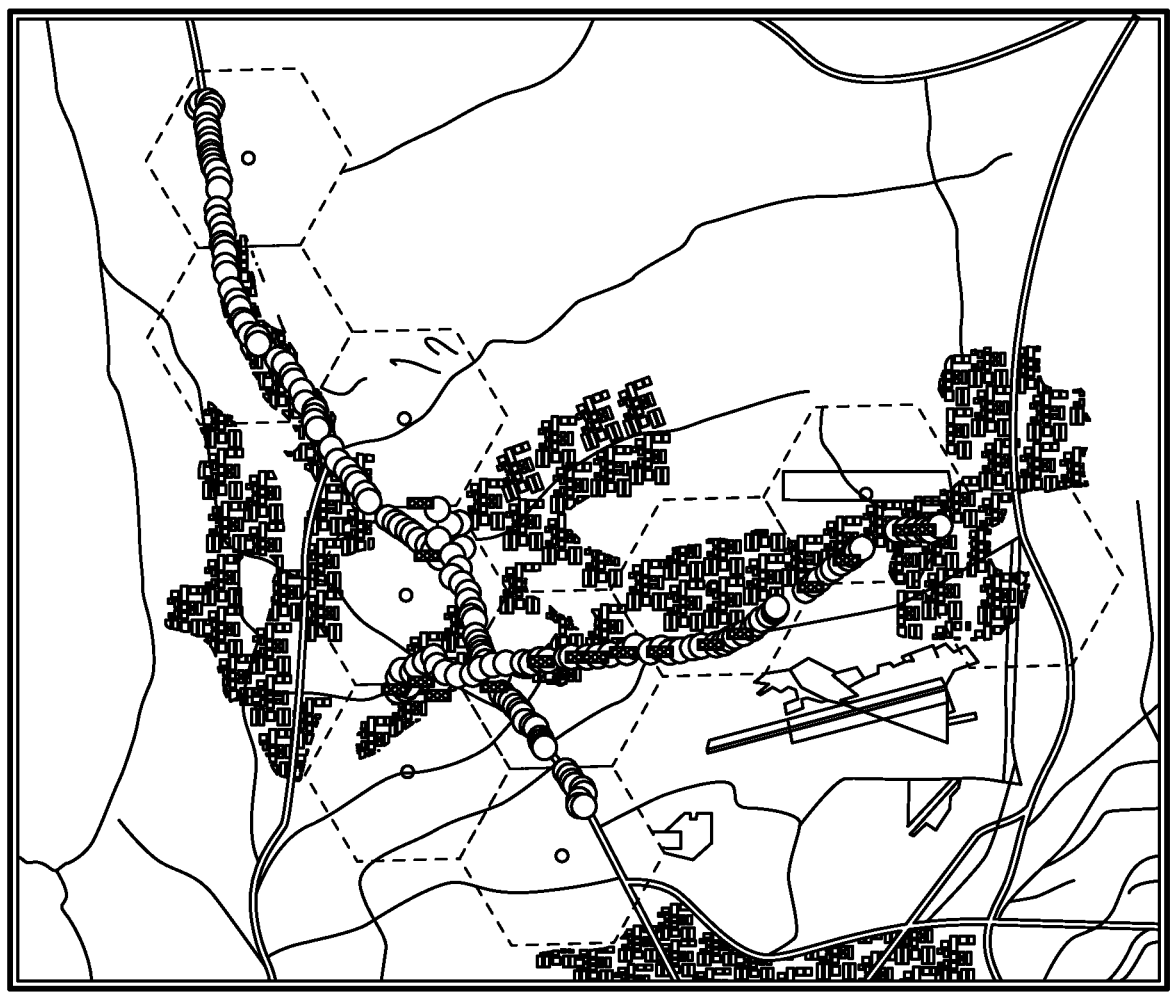
FIG. 19 illustrates an example of a system or method of mapping traffic boundaries in accordance with certain aspects of the present disclosure.

FIG. 19 illustrates multiple mapped regions in a number of hexagonal tiles.

Figure 20:
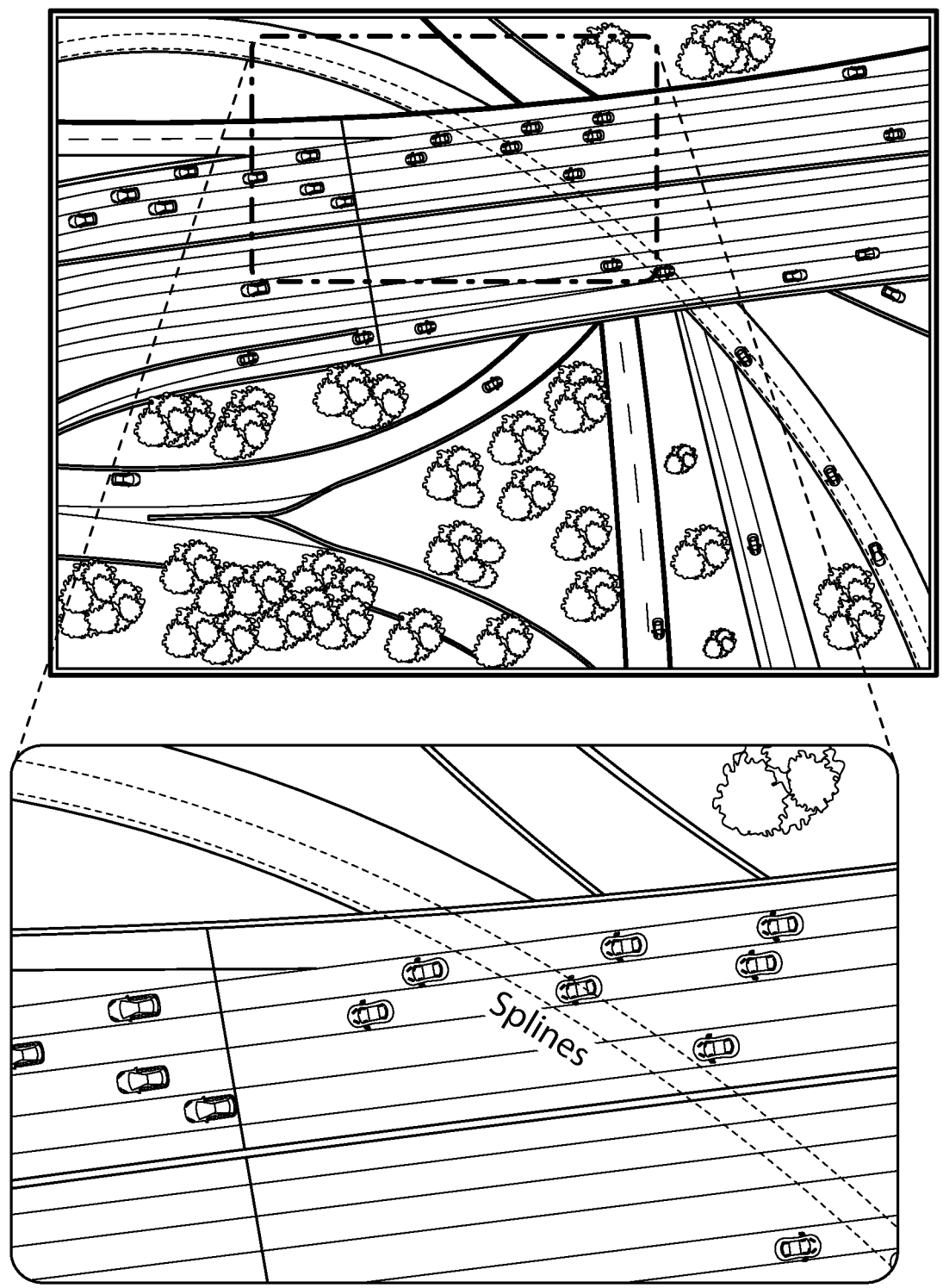
FIG. 20 illustrates an example of a system or method of mapping traffic boundaries in accordance with certain aspects of the present disclosure.

FIG. 20 illustrates a spline-fit of traffic boundary data corresponding to a lane boundary on a highway interchange.

Figure 21:
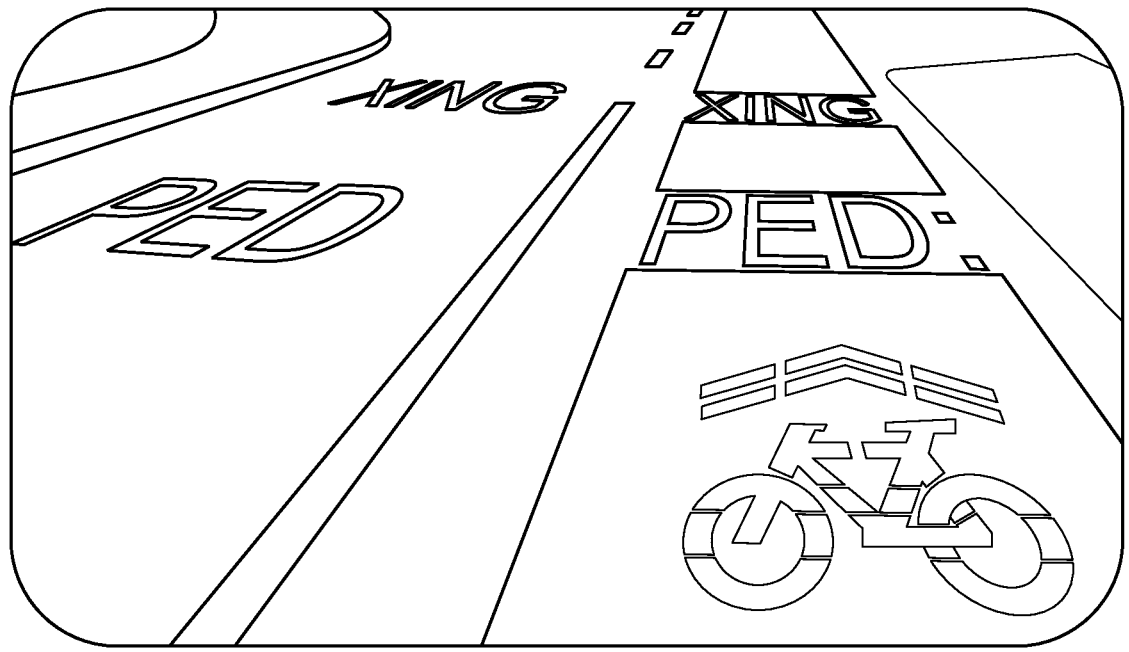
FIG. 21 illustrates an example of a system or method of mapping traffic boundaries in accordance with certain aspects of the present disclosure.
Figure 21:
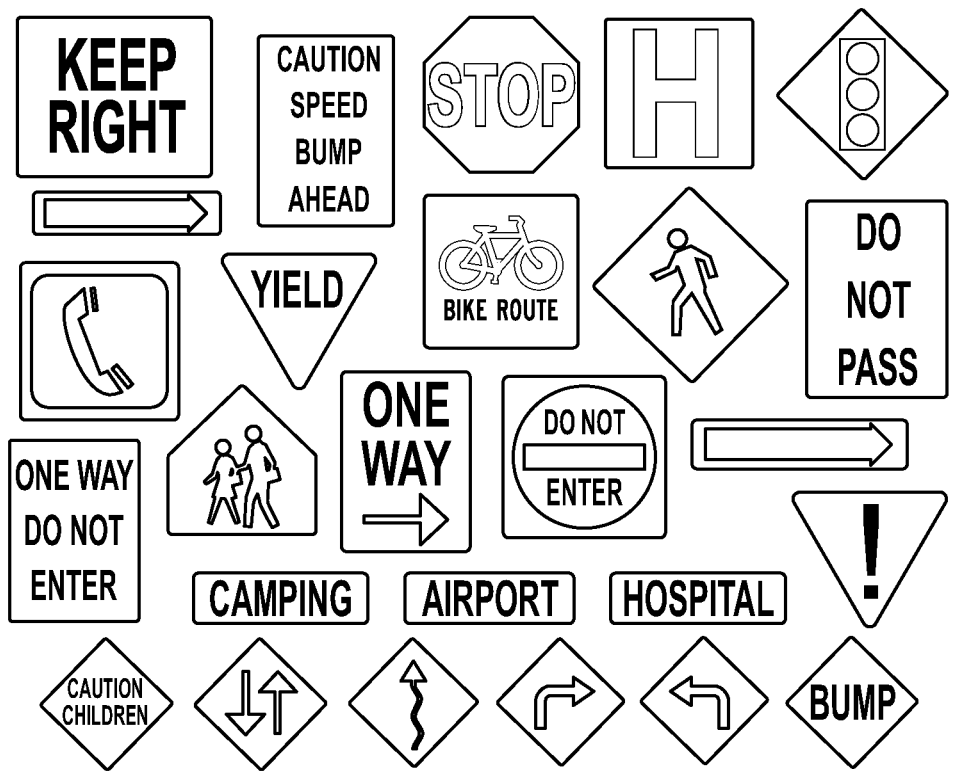

FIG. 21 illustrates a variety of visual objects that may be detected in a mapping system. The visual objects in this image include road markings, such as bike lane markings, and signs, such as a pedestrian crosswalk sign.

Figure 22:
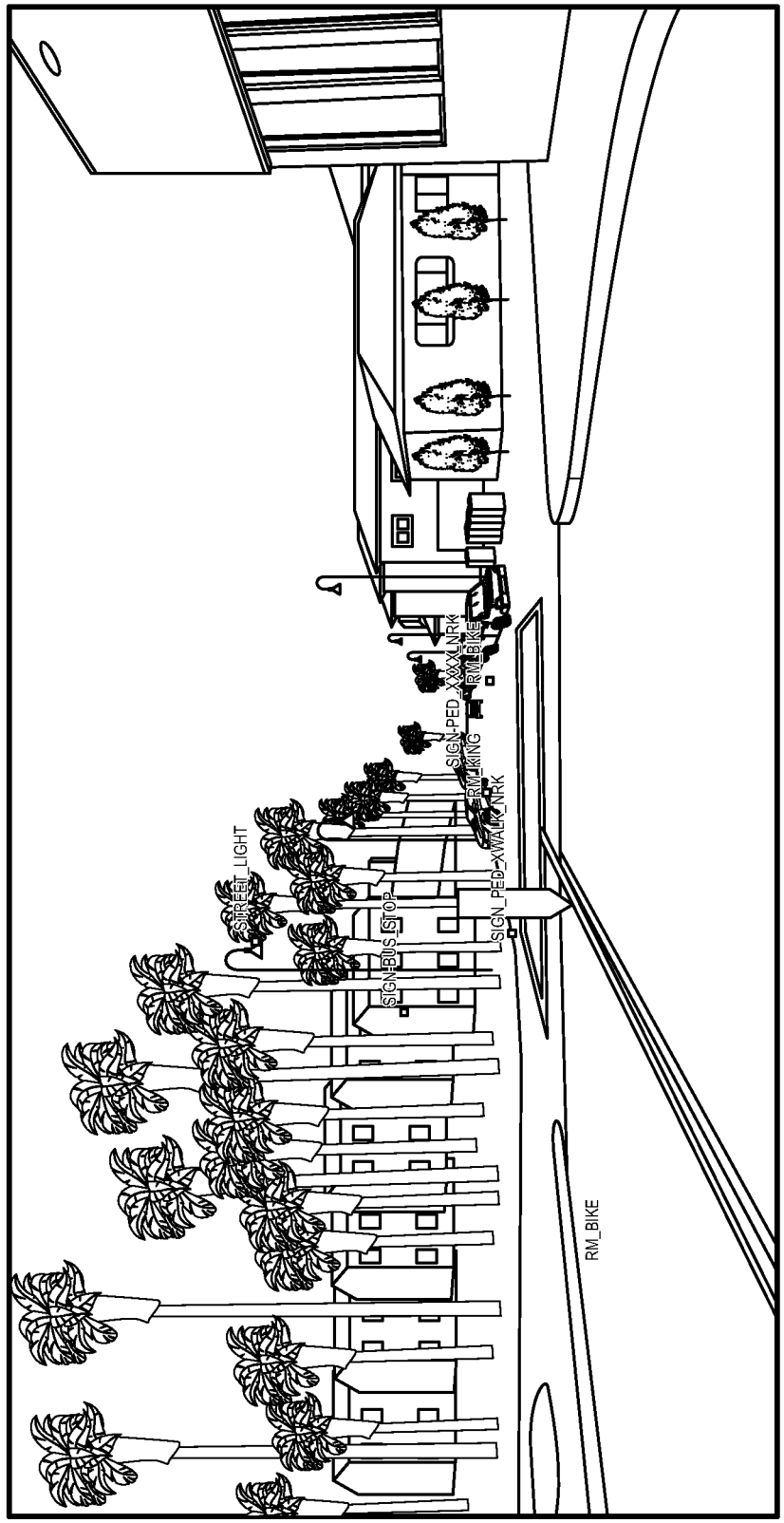
FIG. 22 illustrates an example of a system or method of mapping traffic boundaries in accordance with certain aspects of the present disclosure.

FIG. 22 illustrates a variety of objects that may be detected in a mapping system.

Figure 23:
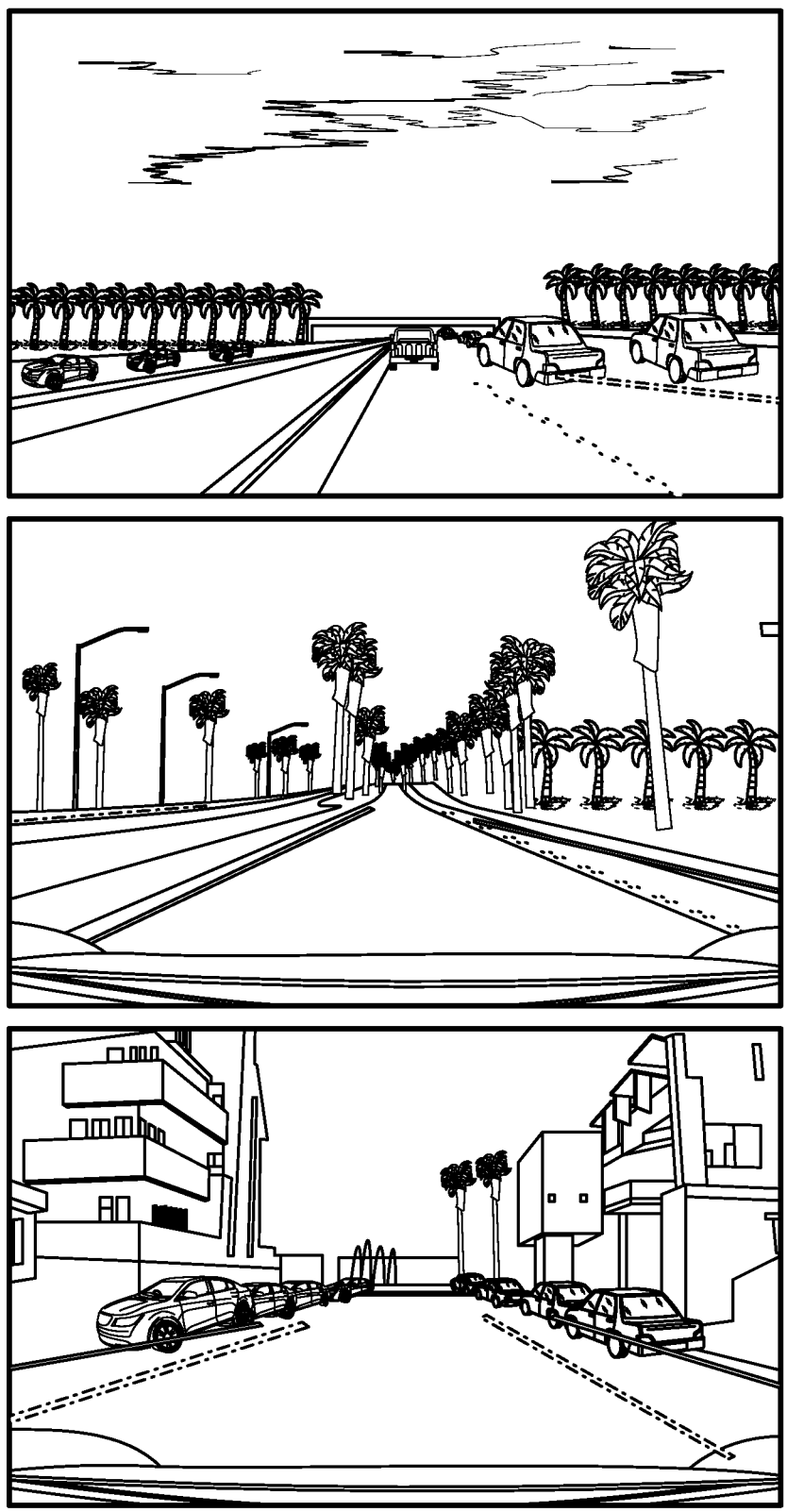
FIG. 23 illustrates an example of a system or method of mapping traffic boundaries in accordance with certain aspects of the present disclosure.

FIG. 23 illustrates examples of visual data with detected traffic boundaries overlaid. These examples include carpool lanes, inferred lanes, road boundaries, and visible lanes that also indicate a boundary of the monitored driver's lane (the Ego Lane).

Figure 24:
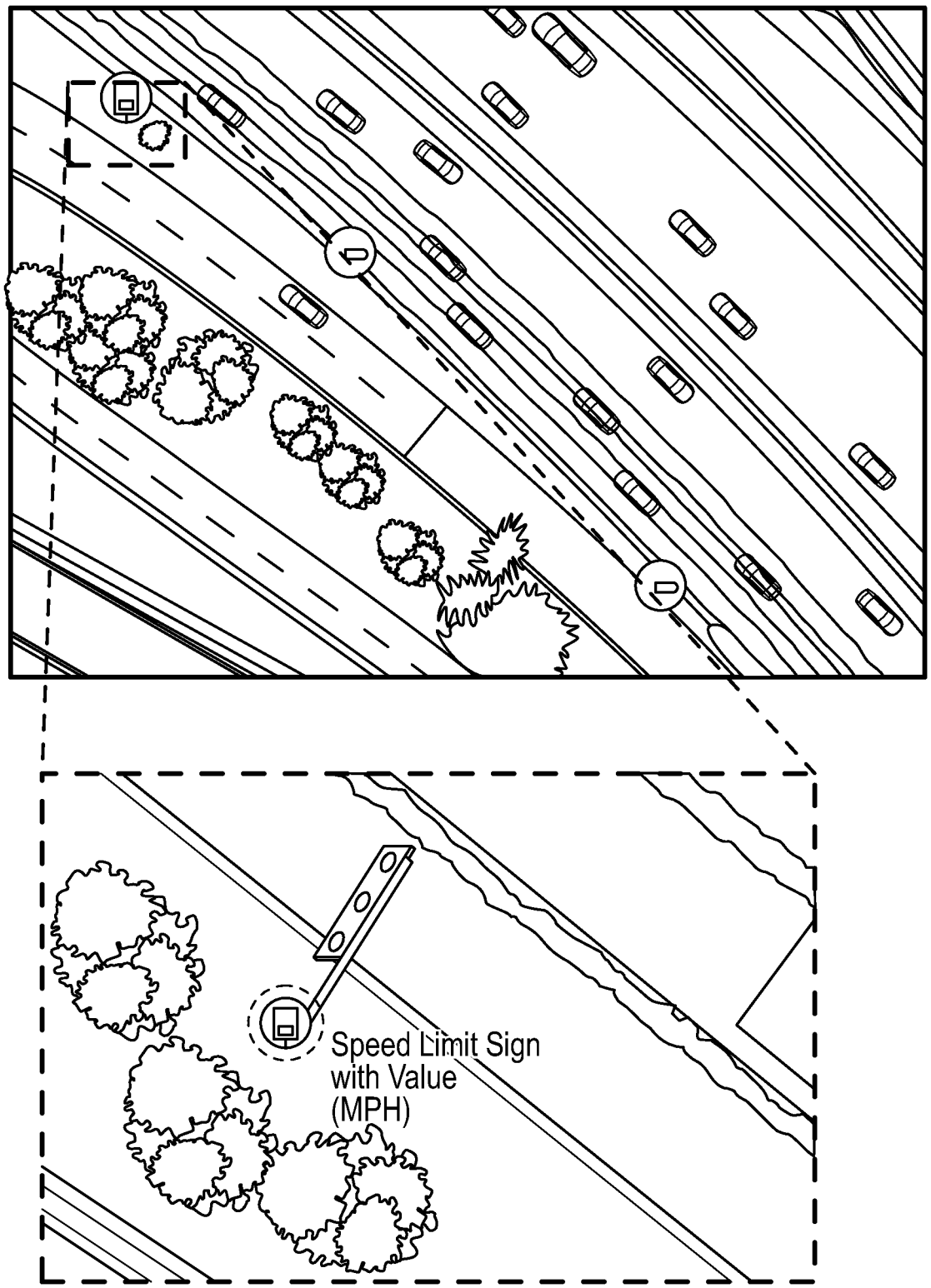
FIG. 24 illustrates an example of a system or method of mapping traffic boundaries in accordance with certain aspects of the present disclosure.

FIG. 24 illustrates an example of a mapped speed limit sign near mapped lanre and road boundaries.

Figure 25:
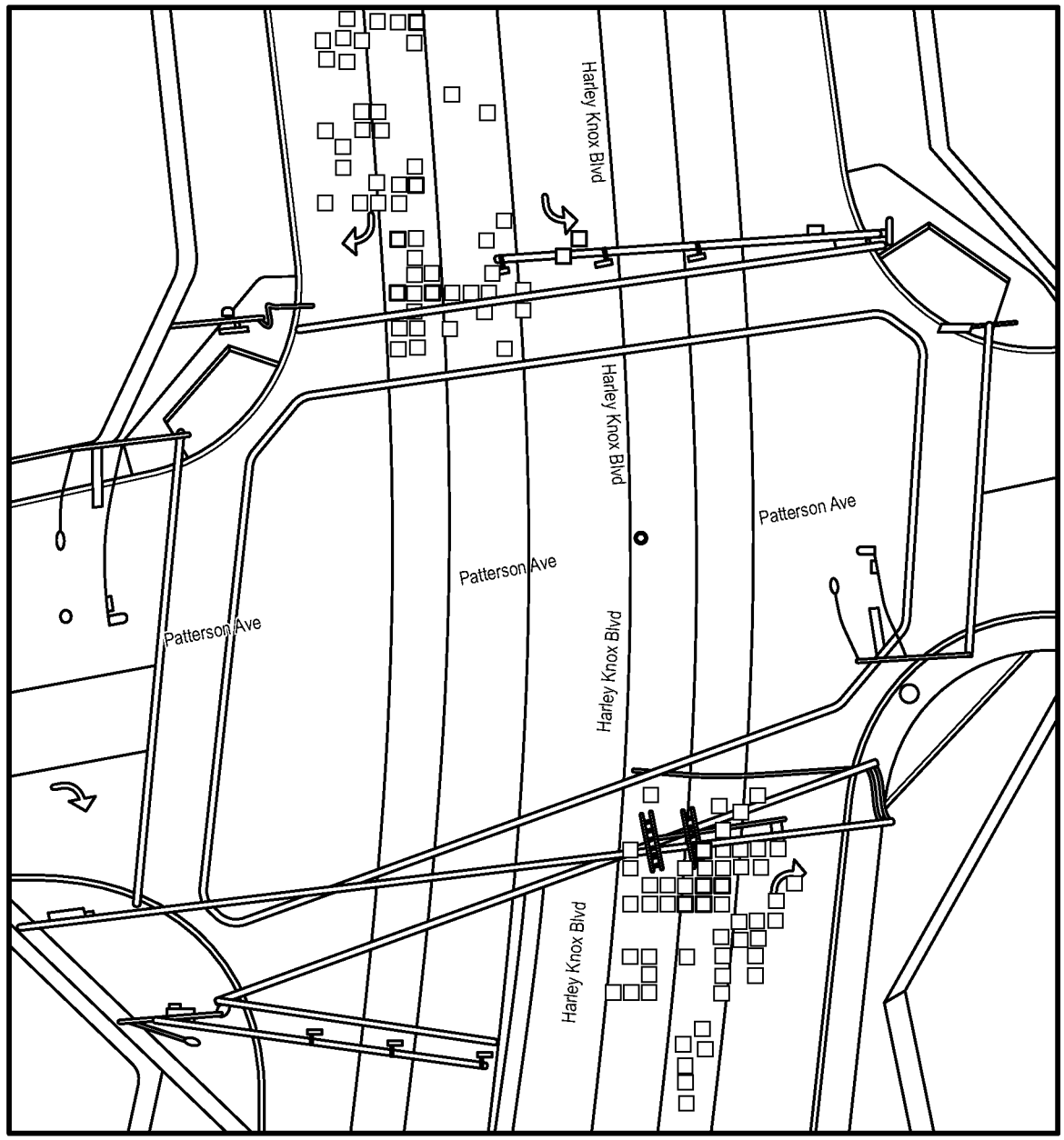
FIG. 25 illustrates an example of a system or method of mapping traffic boundaries in accordance with certain aspects of the present disclosure.

FIG. 25 illustrates an example of identifying a stopping location at a red traffic light using crowd-sourcing. In this example, small boxes reflect stopping positions of a number of different vehicles at different times at the intersection that is illustrated with an aerial satellite view.

Figure 26:
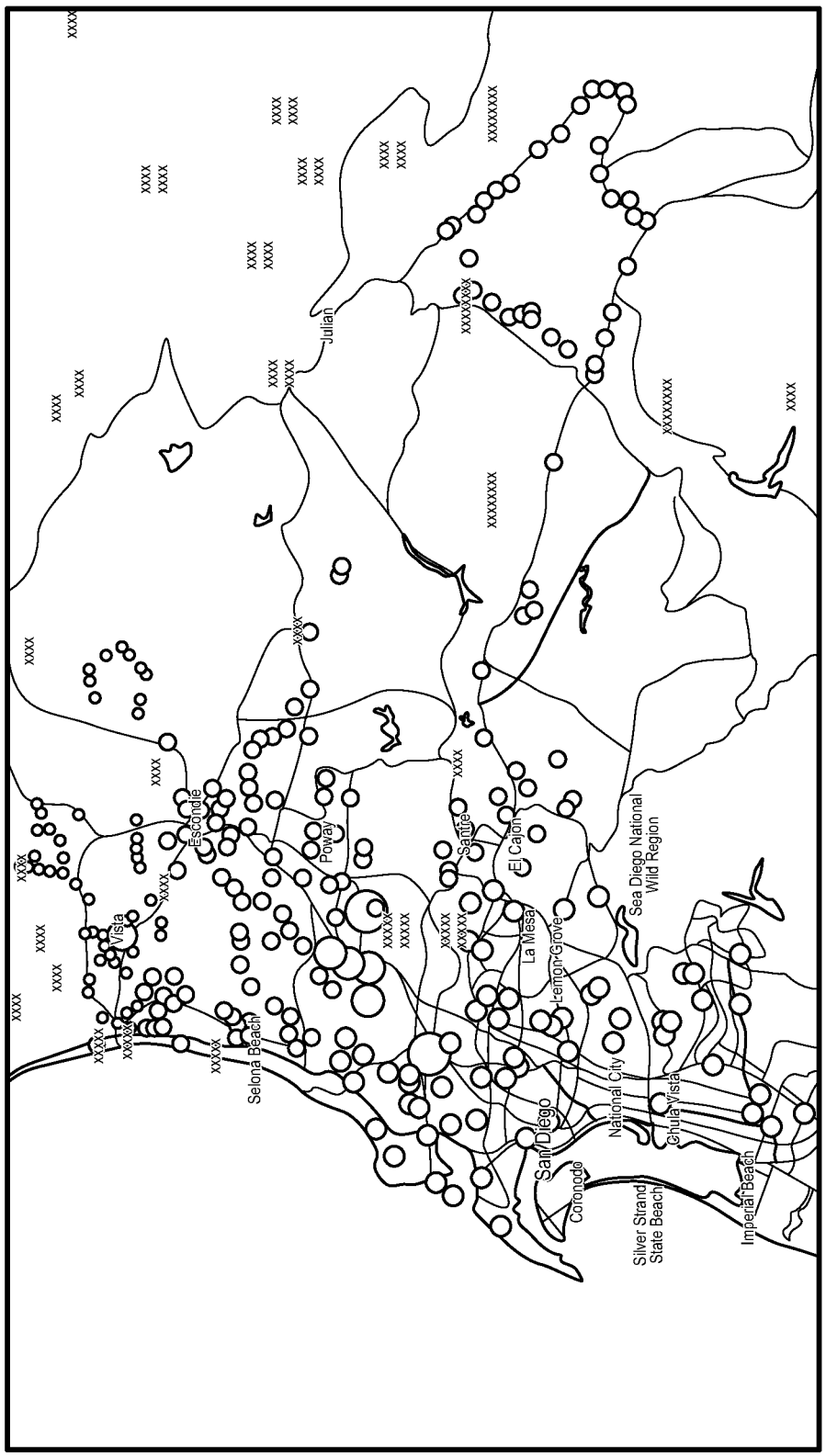
FIG. 26 illustrates an example of a system or method of mapping traffic boundaries in accordance with certain aspects of the present disclosure.

FIG. 26 illustrates an example of behavioral mapping according to certain aspects of the present disclosure. In this figure, small circles indicate all of the locations at which a traffic light was detected. The large circles points indicate traffic violations. This example shows that there is one especially problematic intersection in the northwest corner of the map.

Figure 27:
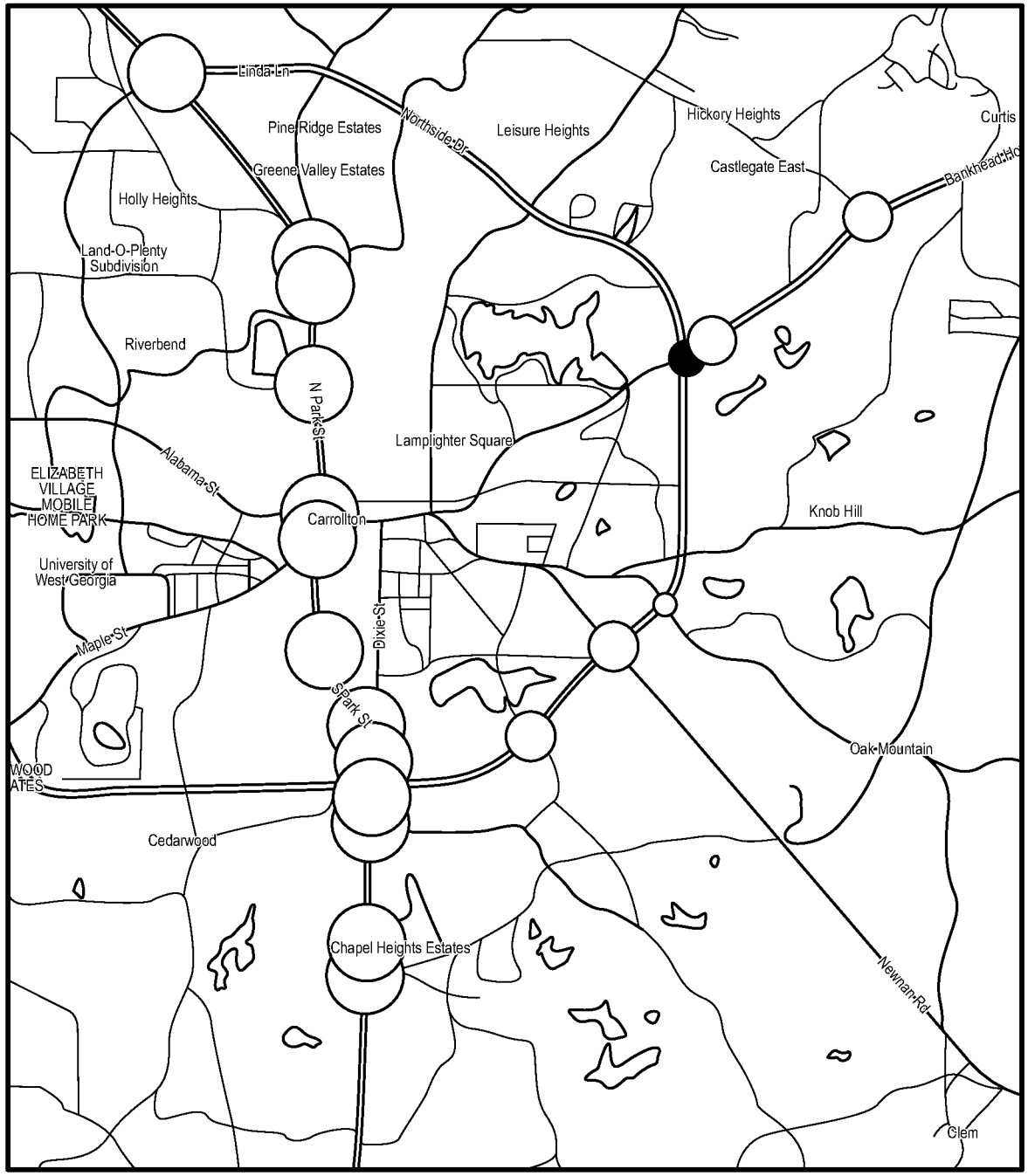
FIG. 27 illustrates an example of a system or method of mapping traffic boundaries in accordance with certain aspects of the present disclosure.

FIG. 27 illustrates an example of behavioral mapping in which white and filled dots indicate the locations of traffic lights. In this example, the color of the dot indicates the percentage of times that traffic light was crossed in an illegal or unsafe manner. The size of the dot indicates the number of crossings. This visualization shows a frequency of visiting a certain traffic light, and the color of the dot illustrates the number of violations normalized by the number of visits. Accordingly, the number of violations may be normalized by the number of opportunities of a violation.

Figure 28:
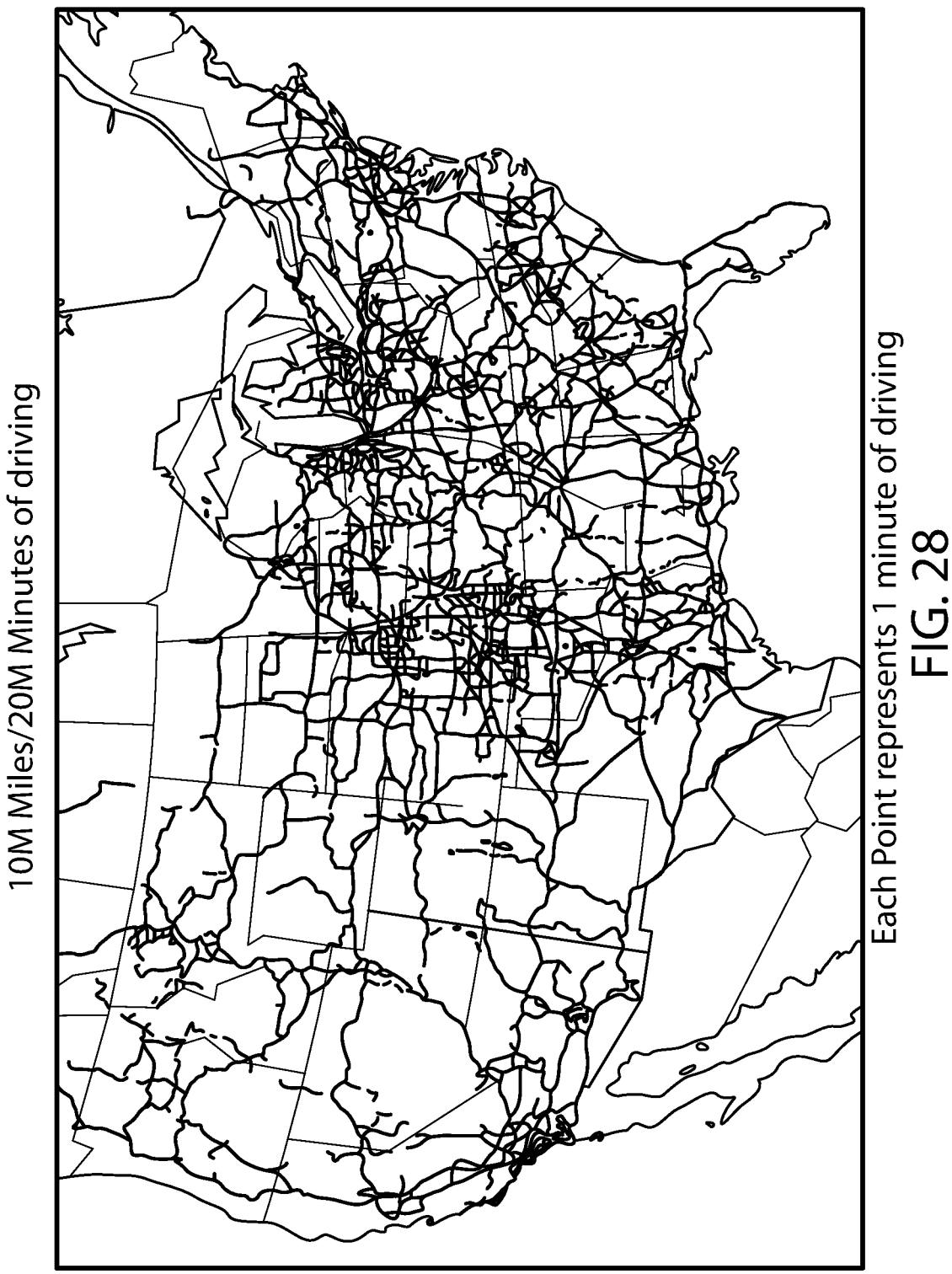
FIG. 28 illustrates an example of a system or method of mapping traffic boundaries in accordance with certain aspects of the present disclosure.

FIG. 28 illustrates a depiction of an occupancy grid at a national level. In this image, each visited location in the United States by any truck or vehicle from a number of driving fleets is indicated with a dot. The collection of dots substantially draws out the major roadways of the United States. This map illustrates vehicle coverage over the United States corresponding to 10 million miles of driving by a diverse set of professional fleet drivers.

Figure 29:
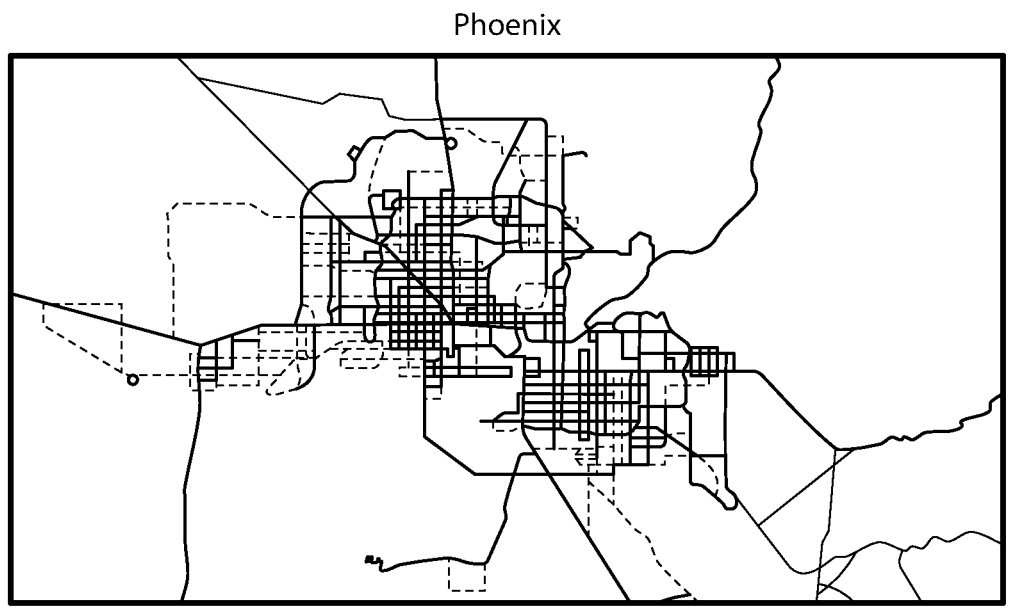
FIG. 29 illustrates an example of a system or method of mapping traffic boundaries in accordance with certain aspects of the present disclosure.
Figure 29:
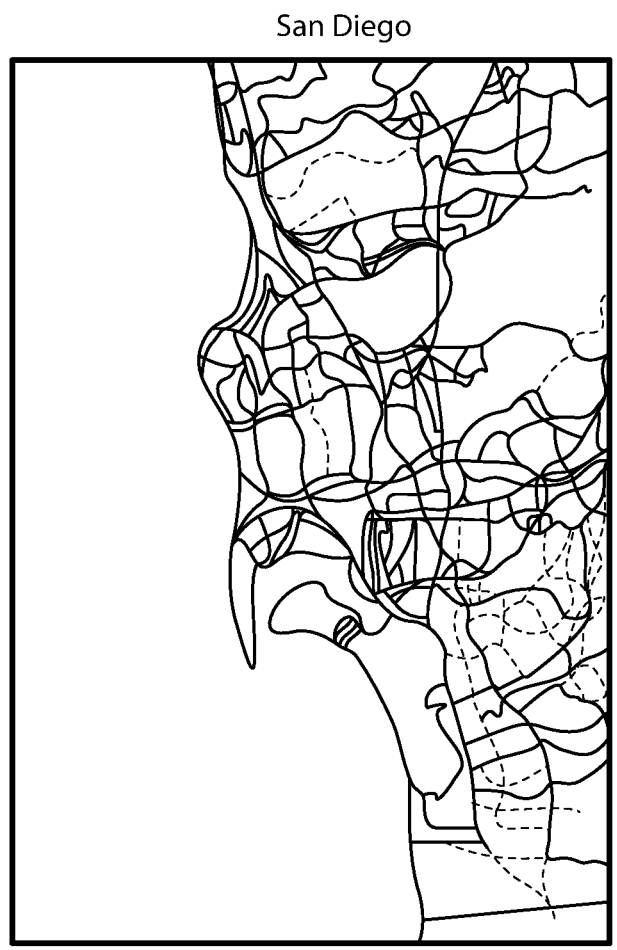

FIG. 29 illustrates an occupancy grid using the same conventions as in FIG. 28. The map in the top image is focused on the city of Phoenix, Ariz. The map in the bottom image is focused on the city of San Diego. The dots on the map, which appear as solid slides correspond to detected road boundary locations as an unrefined occupancy grid map. In addition to these road boundaries, other layers of the maps (not shown) may include locations of identified fire hydrants, no-U-turn signs, stop signs, speed limit signs, and no-parking signs, and the like.

Figure 30:
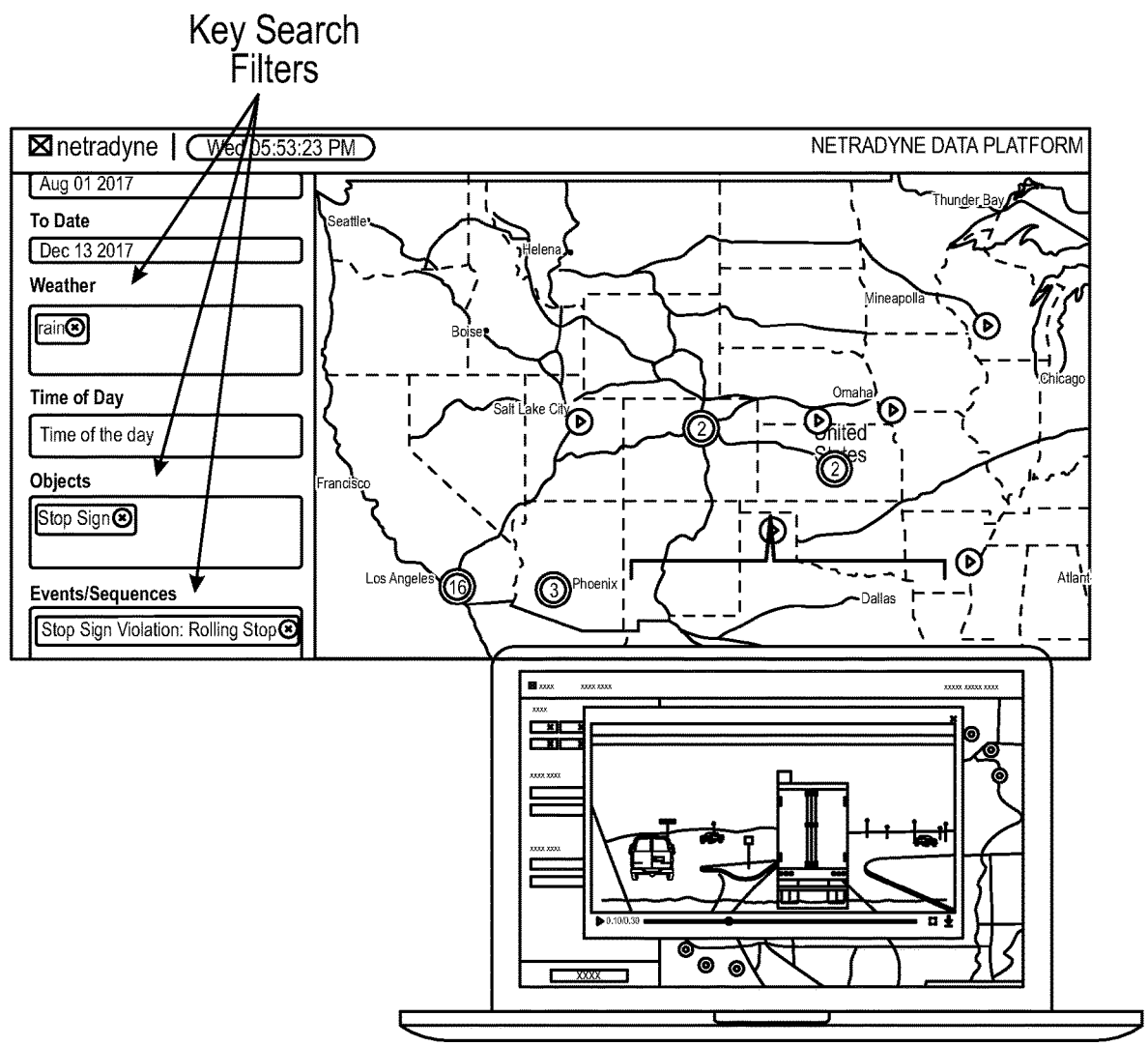
FIG. 30 illustrates an example of a system or method of mapping traffic boundaries in accordance with certain aspects of the present disclosure.

FIG. 30 illustrates a system enabled by certain aspects of the present disclosure by which a user may search for videos in real-time for desired driving scenarios encountered by enabled vehicular systems.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more specialized processors for implementing the neural networks, for example, as well as for other processing systems described herein.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method, comprising:
receiving visual data from a camera on a vehicle;
detecting a traffic boundary within the visual data;
selecting a first one or more cells of an occupancy grid based on a bird's eye view projection of the detected traffic boundary, wherein each cell of the occupancy grid corresponds to a position on a road relative to the vehicle;
incrementing a value of the first one or more cells;
receiving a portion of a traffic boundary map;
computing a cross-correlation between the occupancy grid and the portion of the traffic boundary map to produce at least one consistency value; and
localizing the vehicle within the traffic boundary map based on the at least one consistency value.

2. The method of claim 1, further comprising:
selecting a second one or more cells of the occupancy grid, wherein the second one or more cells substantially surround the first one or more cells; and
decrementing a value of the second one or more cells.

3. The method of claim 1, further comprising:
determining a position, with respect to the portion of the traffic boundary map, of a particle in a particle filter; wherein a consistency value of the at least one consistency value corresponds to the determined position of the particle.

4. The method of claim 3, further comprising:
receiving inertial measurement data from a sensor on the vehicle; wherein the position of the particle is based at least in part on the inertial measurement data.

5. The method of claim 3, further comprising:
receiving global positioning data from a sensor on the vehicle; wherein the position of the particle is based at least in part on the global positioning data.

6. The method of claim 3, wherein a resampling weight for the particle is based on the determined consistency value corresponding to the particle.

7. The method of claim 1, wherein the portion of the traffic boundary map comprises a spline, wherein the spline represents a previously mapped traffic boundary.

8. The method of claim 1, wherein the portion of the traffic boundary map comprises a second occupancy grid, wherein values of cells of the second occupancy grid indicate locations of previously mapped traffic boundaries.

9. The method of claim 1, wherein more than one consistency values are computed, each consistency value of the more than one consistency values corresponding to a spatial offset between the occupancy grid and the traffic boundary map, and each spatial offset corresponding to a candidate location of the vehicle within the traffic boundary map.

10. The method of claim 9, further comprising:
normalizing the more than one consistency values to produce a spatial probability distribution, wherein the spatial probability distribution quantifies a probability of the vehicle being located at each of a plurality of candidate locations within the traffic boundary map.

11. The method of claim 9, wherein localizing the vehicle comprises:
selecting a candidate location of the plurality of candidate locations having a highest consistency value.

12. The method of claim 9, wherein localizing the vehicle comprises:
computing a center-of-mass based on the plurality of candidate locations, each candidate location of the plurality of candidate locations weighted by a corresponding consistency value.

13. The method of claim 1, wherein a distance from the vehicle to the detected traffic boundary in occupancy grid coordinates is based at least in part on an estimate of the camera's pose.

14. The method of claim 1, wherein the traffic boundary is detected with a neural network that is trained to detect traffic boundaries and objects that tend to appear on or near roads.

15. The method of claim 14, wherein the visual data is processed by the neural network on an edge computing device that is in the vehicle.

16. The method of claim 1, where the vehicle is travelling on a road with a plurality of lanes, and wherein localizing the vehicle comprises determining a lane of the plurality of lanes in which the vehicle is travelling.

17. The method of claim 1, wherein the traffic boundary is a road boundary.

18. The method of claim 1, further comprising:
updating the portion of the traffic boundary map based on the occupancy grid and the at least one consistency value.

19. A computer program product, the computer program product comprising:
a non-transitory computer-readable medium having program code recorded thereon, the program code, when executed by a processor, causes the processor to:
receive visual data from a camera on a vehicle;
detect a traffic boundary within the visual data;
select a first one or more cells of an occupancy grid based on a bird's eye view projection of the detected traffic boundary, wherein each cell of the occupancy grid corresponds to a position on a road relative to the vehicle;
increment a value of the first one or more cells;
receive a portion of a traffic boundary map;
compute a cross-correlation between the occupancy grid and the portion of the traffic boundary map to produce at least one consistency value; and
localize the vehicle within the traffic boundary map based on the at least one consistency value.

20. An apparatus comprising:
at least one memory unit; and
at least one processor coupled to the at least one memory unit, in which the at least one processor is configured to:
receive visual data from a camera on a vehicle;
detect a traffic boundary within the visual data;
select a first one or more cells of an occupancy grid based on a bird's eye view projection of the detected traffic boundary, wherein each cell of the occupancy grid corresponds to a position on a road relative to the vehicle;
increment a value of the first one or more cells;
receive a portion of a traffic boundary map;
compute a cross-correlation between the occupancy grid and the portion of the traffic boundary map to produce at least one consistency value; and
localize the vehicle within the traffic boundary map based on the at least one consistency value.

* * * * *